United States Patent
Hedtke et al.

(10) Patent No.: US 7,977,924 B2
(45) Date of Patent: *Jul. 12, 2011

(54) INDUSTRIAL PROCESS POWER SCAVENGING DEVICE AND METHOD OF DERIVING PROCESS DEVICE POWER FROM AN INDUSTRIAL PROCESS

(75) Inventors: Robert C. Hedtke, Young America, MN (US); David A. Broden, Andover, MN (US); Liang-Ju Lu, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 144 days.

This patent is subject to a terminal disclaimer.

(21) Appl. No.: 12/263,625

(22) Filed: Nov. 3, 2008

(65) Prior Publication Data

US 2010/0109331 A1    May 6, 2010

(51) Int. Cl.
*H02K 35/00* (2006.01)
*G01F 1/32* (2006.01)

(52) U.S. Cl. .............. 322/3; 310/322; 700/22; 455/572; 340/606; 73/861.23

(58) Field of Classification Search .................. None
See application file for complete search history.

(56) References Cited

U.S. PATENT DOCUMENTS

| | | | |
|---|---|---|---|
| 2,883,489 A | 4/1959 | Eadie, Jr. et al. | 335/148 |
| 3,232,712 A | 2/1966 | Stearns | 23/255 |
| 3,612,851 A | 10/1971 | Fowler | 362/30 |
| 3,633,053 A | 1/1972 | Peters | 310/15 |
| D225,743 S | 1/1973 | Seltzer | D10/102 |
| 3,885,432 A * | 5/1975 | Herzl | 73/861.22 |
| 3,964,296 A | 6/1976 | Matzuk | 73/67.5 |
| 4,005,319 A | 1/1977 | Nilsson et al. | 310/8.3 |
| 4,083,031 A | 4/1978 | Pharo, Jr. | 367/135 |
| 4,084,155 A * | 4/1978 | Herzl et al. | 340/870.39 |
| 4,116,060 A * | 9/1978 | Frederick | 73/861.22 |
| 4,237,454 A | 12/1980 | Meyer | 340/682 |
| 4,255,964 A | 3/1981 | Morison | 73/24.01 |
| 4,292,769 A | 10/1981 | Maag et al. | 451/9 |

(Continued)

FOREIGN PATENT DOCUMENTS

CH    672 368 A5    11/1989

(Continued)

OTHER PUBLICATIONS

Notification of Transmittal of the Int'l Search Report and the Written Opinion of the Inter'l Searching Authority, dated Dec. 17, 2008, for PCT/US2007/011428.

(Continued)

*Primary Examiner* — Harshad Patel
(74) *Attorney, Agent, or Firm* — Westman, Champlin & Kelly, P.A.

(57) ABSTRACT

In a particular embodiment, a process device includes a fluid disruption generation element to generate a fluid disruption within process fluid flowing through a pipe associated with an industrial process and a process variable sensor coupled to the disruption generation element to measure a process parameter. The process device further includes a power generation element adapted to generate an electrical output signal in response to the fluid disruption and a power storage component coupled to the power generation element. The power storage component is adapted to accumulate a charge based on the electrical output signal.

27 Claims, 16 Drawing Sheets

U.S. PATENT DOCUMENTS

| | | | |
|---|---|---|---|
| 4,355,536 A | 10/1982 | McShane et al. | 73/633 |
| 4,361,045 A | 11/1982 | Iwasaki | 73/654 |
| 4,370,890 A | 2/1983 | Frick | 73/18 |
| 4,383,443 A | 5/1983 | Langdon | 73/290 |
| 4,383,801 A | 5/1983 | Pryor | 416/17 |
| 4,389,895 A | 6/1983 | Rud, Jr. | 73/724 |
| 4,393,711 A | 7/1983 | Lapides | 73/592 |
| 4,423,634 A | 1/1984 | Audenard et al. | 73/587 |
| 4,446,741 A | 5/1984 | Sirokorad et al. | 73/654 |
| 4,448,062 A | 5/1984 | Peterson et al. | 73/86 |
| 4,475,047 A | 10/1984 | Ebert, Jr. | 307/66 |
| 4,476,853 A | 10/1984 | Arbogast | 126/578 |
| 4,536,753 A | 8/1985 | Parker | 340/566 |
| 4,590,466 A | 5/1986 | Wiklund et al. | 340/870.28 |
| 4,641,529 A | 2/1987 | Lorenzi et al. | 73/601 |
| 4,696,191 A | 9/1987 | Claytor et al. | 73/600 |
| 4,704,607 A | 11/1987 | Teather et al. | 340/825.07 |
| 4,749,993 A | 6/1988 | Szabo et al. | 340/870.31 |
| 4,860,232 A | 8/1989 | Lee et al. | 364/571.04 |
| 4,878,012 A | 10/1989 | Schulte et al. | 324/60 |
| 4,895,031 A | 1/1990 | Cage | 73/861.355 |
| 4,977,480 A | 12/1990 | Nishihara | 73/724 |
| 4,979,125 A | 12/1990 | Kwun et al. | 702/35 |
| 4,982,412 A | 1/1991 | Gross | 377/6 |
| 5,014,543 A | 5/1991 | Franklin et al. | 73/40.5 |
| 5,014,949 A | 5/1991 | Koch et al. | 325/207.25 |
| 5,025,202 A | 6/1991 | Ishii et al. | 320/101 |
| 5,047,990 A | 9/1991 | Gafos et al. | 367/6 |
| 5,094,109 A | 3/1992 | Dean et al. | 73/718 |
| D331,370 S | 12/1992 | Williams | D10/46 |
| 5,170,671 A * | 12/1992 | Miau et al. | 73/861.22 |
| 5,223,763 A * | 6/1993 | Chang | 310/339 |
| D345,107 S | 3/1994 | Williams | D10/46 |
| 5,329,818 A | 7/1994 | Frick et al. | 73/708 |
| 5,369,674 A | 11/1994 | Yokose et al. | 376/245 |
| 5,372,041 A | 12/1994 | Yoshida et al. | 73/514.31 |
| 5,495,769 A | 3/1996 | Broden et al. | 73/18 |
| 5,497,661 A | 3/1996 | Stripf et al. | 73/611 |
| 5,554,809 A | 9/1996 | Tobita et al. | 73/700 |
| 5,606,513 A | 2/1997 | Louwagie et al. | 702/138 |
| 5,637,802 A | 6/1997 | Frick et al. | 73/724 |
| 5,642,301 A | 6/1997 | Warrior et al. | 364/571.02 |
| 5,650,943 A | 7/1997 | Powell et al. | 364/550 |
| 5,656,782 A | 8/1997 | Powell, II et al. | 73/756 |
| 5,665,899 A | 9/1997 | Willcox | 731/1.63 |
| 5,682,476 A | 10/1997 | Tapperson et al. | 395/200.05 |
| 5,705,978 A | 1/1998 | Frick et al. | 340/511 |
| 5,756,898 A | 5/1998 | Diatschenko et al. | 73/592 |
| 5,793,963 A | 8/1998 | Tapperson et al. | 395/200.31 |
| 5,796,006 A | 8/1998 | Bellet et al. | 73/658 |
| 5,851,083 A | 12/1998 | Palan | 403/337 |
| 5,854,993 A | 12/1998 | Grichnik | 702/54 |
| 5,870,695 A | 2/1999 | Brown et al. | 702/138 |
| 5,872,494 A | 2/1999 | Palan et al. | 333/252 |
| 5,874,676 A | 2/1999 | Maki, Jr. | 73/579 |
| 5,899,962 A | 5/1999 | Louwagie et al. | 702/138 |
| 5,929,372 A | 7/1999 | Oudoire et al. | 136/208 |
| 5,954,526 A | 9/1999 | Smith | 439/136 |
| 5,956,663 A | 9/1999 | Eryurek | 702/183 |
| 5,978,658 A | 11/1999 | Shoji | 455/66 |
| 6,017,143 A | 1/2000 | Eryurek et al. | 706/23 |
| 6,069,560 A | 5/2000 | Larsson | 340/540 |
| 6,079,276 A | 6/2000 | Frick et al. | 73/18 |
| 6,119,047 A | 9/2000 | Eryurek et al. | 700/28 |
| 6,127,739 A | 10/2000 | Appa | 290/55 |
| 6,199,018 B1 | 3/2001 | Quist et al. | 702/34 |
| 6,282,247 B1 | 8/2001 | Shen | 375/285 |
| 6,289,735 B1 | 9/2001 | Dister et al. | 73/579 |
| 6,295,875 B1 | 10/2001 | Frick et al. | 73/718 |
| 6,338,283 B1 | 1/2002 | Blazquez Navarro | 73/865.8 |
| 6,360,277 B1 | 3/2002 | Ruckley et al. | 709/250 |
| 6,367,328 B1 | 4/2002 | Gorman et al. | 73/592 |
| 6,378,364 B1 | 4/2002 | Pelletier et al. | 73/152.47 |
| 6,385,972 B1 | 5/2002 | Fellows | 60/517 |
| 6,405,139 B1 | 6/2002 | Kicinski et al. | 702/33 |
| 6,449,574 B1 | 9/2002 | Eryurek et al. | 702/99 |
| 6,493,689 B2 | 12/2002 | Kotoulas et al. | 706/23 |
| 6,497,222 B2 | 12/2002 | Bolz et al. | 123/476 |
| 6,508,131 B2 | 1/2003 | Frick | 73/756 |
| 6,567,006 B1 | 5/2003 | Lander et al. | 340/605 |
| 6,574,515 B1 | 6/2003 | Kirkpatrick et al. | 700/19 |
| 6,584,847 B1 | 7/2003 | Hirose | 73/579 |
| 6,597,997 B2 | 7/2003 | Tingley | 702/34 |
| 6,601,005 B1 | 7/2003 | Eryurek et al. | 702/104 |
| 6,661,220 B1 | 12/2003 | Glehr | 324/207.17 |
| 6,711,446 B2 | 3/2004 | Kirkpatrick et al. | 700/19 |
| 6,727,812 B2 | 4/2004 | Sauler et al. | 340/511 |
| 6,747,573 B1 | 6/2004 | Gerlach et al. | 340/870.21 |
| 6,751,560 B1 | 6/2004 | Tingley et al. | 702/51 |
| 6,774,814 B2 | 8/2004 | Hilleary | 340/870.07 |
| 6,778,100 B2 | 8/2004 | Schempf | 340/870.07 |
| 6,792,259 B1 | 9/2004 | Parise | 455/343.1 |
| 6,839,546 B2 | 1/2005 | Hedtke | 455/67.11 |
| 6,880,403 B1 | 4/2005 | Shimada et al. | 73/652 |
| 6,891,838 B1 | 5/2005 | Petite et al. | 370/401 |
| 6,904,295 B2 | 6/2005 | Yang | 455/522 |
| 6,910,332 B2 | 6/2005 | Fellows | 60/522 |
| 6,920,789 B2 | 7/2005 | Sakai | 73/587 |
| 6,951,133 B2 | 10/2005 | Passarelli | 73/643 |
| 7,010,294 B1 | 3/2006 | Pyotsia et al. | 455/420 |
| 7,010,459 B2 | 3/2006 | Eryurek et al. | 702/182 |
| 7,023,205 B1 | 4/2006 | Krupp | 324/239 |
| 7,035,773 B2 | 4/2006 | Keyes et al. | 702/188 |
| 7,040,179 B2 | 5/2006 | Drahm et al. | 73/861.356 |
| 7,058,542 B2 | 6/2006 | Hauhia et al. | 702/183 |
| 7,073,394 B2 * | 7/2006 | Foster | 73/861.22 |
| 7,116,036 B2 | 10/2006 | Balasubramaniam et al. | 310/322 |
| 7,137,307 B2 | 11/2006 | Huybrechts et al. | 73/861.12 |
| 7,233,745 B2 | 6/2007 | Loechner | 398/128 |
| 7,254,518 B2 | 8/2007 | Eryurek et al. | 702/183 |
| 7,258,024 B2 | 8/2007 | Dimarco et al. | 73/861.22 |
| 7,262,693 B2 | 8/2007 | Karschnia et al. | 340/508 |
| 7,271,679 B2 | 9/2007 | Lundberg et al. | 333/24 |
| 7,290,450 B2 | 11/2007 | Brown et al. | 73/579 |
| 7,301,454 B2 | 11/2007 | Seyfang et al. | 340/539.26 |
| 7,321,846 B1 | 1/2008 | Huisenga et al. | 702/183 |
| 7,329,959 B2 | 2/2008 | Kim et al. | 290/2 |
| 2001/0025349 A1 | 9/2001 | Sharood et al. | 713/340 |
| 2002/0065631 A1 | 5/2002 | Loechner | 702/188 |
| 2002/0078752 A1 | 6/2002 | Braunling et al. | 73/627 |
| 2002/0148236 A1 | 10/2002 | Bell | 62/3.3 |
| 2002/0163323 A1 | 11/2002 | Kasai et al. | 323/284 |
| 2003/0032993 A1 | 2/2003 | Mickle et al. | 607/60 |
| 2003/0079553 A1 | 5/2003 | Cain et al. | 73/861.27 |
| 2003/0143958 A1 | 7/2003 | Elias et al. | 455/73 |
| 2003/0171827 A1 | 9/2003 | Keyes et al. | 700/19 |
| 2003/0199778 A1 | 10/2003 | Mickle et al. | 600/509 |
| 2003/0204371 A1 | 10/2003 | Sciamanna | 702/183 |
| 2004/0025593 A1 | 2/2004 | Hashimoto et al. | 73/643 |
| 2004/0086021 A1 | 5/2004 | Litwin | 374/120 |
| 2004/0093174 A1 | 5/2004 | Lander | 702/56 |
| 2004/0142733 A1 | 7/2004 | Parise | 455/572 |
| 2004/0199681 A1 | 10/2004 | Hedtke | 710/37 |
| 2004/0203434 A1 | 10/2004 | Karschnia et al. | 455/67.11 |
| 2004/0211456 A1 | 10/2004 | Brown et al. | 136/243 |
| 2004/0214543 A1 | 10/2004 | Osone et al. | 455/197.2 |
| 2004/0242169 A1 | 12/2004 | Albsmeier et al. | 455/91 |
| 2004/0259533 A1 | 12/2004 | Nixon et al. | 455/414.1 |
| 2005/0017602 A1 | 1/2005 | Arms et al. | 310/339 |
| 2005/0023858 A1 | 2/2005 | Bingle et al. | 296/76 |
| 2005/0029236 A1 | 2/2005 | Gambino et al. | 219/121.69 |
| 2005/0046595 A1 | 3/2005 | Blyth | 340/908 |
| 2005/0072239 A1 | 4/2005 | Longsdorf et al. | 73/649 |
| 2005/0099010 A1 | 5/2005 | Hirsch | 290/422 |
| 2005/0115601 A1 | 6/2005 | Olsen et al. | 136/212 |
| 2005/0118468 A1 | 6/2005 | Adams et al. | 429/22 |
| 2005/0130605 A1 | 6/2005 | Karschnia et al. | 455/90.3 |
| 2005/0134148 A1 | 6/2005 | Buhler et al. | 310/339 |
| 2005/0164684 A1 | 7/2005 | Chen et al. | 455/414.1 |
| 2005/0182501 A1 | 8/2005 | Franchuk et al. | 700/81 |
| 2005/0201349 A1 | 9/2005 | Budampati | 370/342 |
| 2005/0208908 A1 | 9/2005 | Karschnia et al. | 455/127.1 |
| 2005/0222698 A1 | 10/2005 | Eryurek et al. | 700/90 |
| 2005/0276233 A1 | 12/2005 | Shepard et al. | 370/254 |
| 2005/0281215 A1 | 12/2005 | Budampati et al. | 370/328 |
| 2005/0289276 A1 | 12/2005 | Karschnia et al. | 710/305 |

| | | | |
|---|---|---|---|
| 2006/0002368 A1 | 1/2006 | Budampati et al. | 370/351 |
| 2006/0022555 A1 | 2/2006 | Balasubramaniam et al. | 310/339 |
| 2006/0063522 A1 | 3/2006 | McFarland | 455/423 |
| 2006/0092039 A1 | 5/2006 | Saito et al. | 340/825.37 |
| 2006/0148410 A1 | 7/2006 | Nelson et al. | 455/67.11 |
| 2006/0181406 A1 | 8/2006 | Petite et al. | 340/521 |
| 2006/0227729 A1 | 10/2006 | Budampati et al. | 370/278 |
| 2006/0274644 A1 | 12/2006 | Budampati et al. | 370/216 |
| 2006/0274671 A1 | 12/2006 | Budampati et al. | 370/254 |
| 2006/0277000 A1 | 12/2006 | Wehrs | 702/183 |
| 2006/0287001 A1 | 12/2006 | Budampati et al. | 455/552.1 |
| 2007/0030816 A1 | 2/2007 | Kolavennu | 370/252 |
| 2007/0030832 A1 | 2/2007 | Gonia et al. | 370/338 |
| 2007/0039371 A1* | 2/2007 | Omata et al. | 73/9 |
| 2007/0046480 A1 | 3/2007 | Stein | 340/601 |
| 2007/0054630 A1 | 3/2007 | Scheible et al. | 455/90.3 |
| 2007/0188053 A1 | 8/2007 | Stark | 310/339 |
| 2007/0228737 A1 | 10/2007 | Hirsch | 290/42 |
| 2007/0229255 A1 | 10/2007 | Loechner | 340/540 |
| 2007/0233283 A1 | 10/2007 | Chen | 700/17 |
| 2007/0237137 A1 | 10/2007 | McLaughlin | 370/389 |
| 2007/0275755 A1 | 11/2007 | Chae et al. | 455/557 |
| 2008/0010600 A1 | 1/2008 | Katano | 715/748 |
| 2008/0054645 A1 | 3/2008 | Kulkarni et al. | 290/52 |
| 2008/0088464 A1* | 4/2008 | Gutierrez | 340/606 |
| 2008/0123581 A1 | 5/2008 | Wells et al. | 370/315 |
| 2009/0195222 A1* | 8/2009 | Lu et al. | 322/3 |
| 2009/0260438 A1* | 10/2009 | Hedtke | 73/579 |

FOREIGN PATENT DOCUMENTS

| | | |
|---|---|---|
| CN | 1429354 A | 7/2003 |
| CN | 1442822 A | 9/2003 |
| DE | 3340834 A1 | 5/1985 |
| DE | 35 03 597 C1 | 7/1986 |
| DE | 201 07 112 U1 | 7/2001 |
| DE | 101 04 582 A1 | 10/2001 |
| EP | 0 524 550 A1 | 1/1993 |
| EP | 0 697 586 A2 | 2/1996 |
| EP | 1 202 145 | 5/2002 |
| EP | 1 293 853 | 3/2003 |
| EP | 1 482 568 A2 | 12/2004 |
| GB | 1 397 435 A | 6/1975 |
| GB | 2 145 876 A | 4/1985 |
| GB | 2 320 733 A | 7/1998 |
| JP | 59-075684 | 4/1984 |
| JP | 60-125181 | 7/1985 |
| JP | 02 067794 | 3/1990 |
| JP | 3-118424 | 5/1991 |
| JP | 06 199284 A | 7/1994 |
| JP | 8-247076 | 9/1996 |
| JP | 11-036981 | 2/1999 |
| JP | 11-215867 | 8/1999 |
| JP | 003051894 | 2/2003 |
| JP | 2003134261 | 5/2003 |
| JP | 2004021877 | 1/2004 |
| JP | 2005-72080 | 3/2005 |
| RU | 2 131 934 C | 6/1999 |
| WO | WO 88/05964 | 8/1988 |
| WO | WO 91/11029 | 7/1991 |
| WO | WO 95/07522 | 3/1995 |
| WO | WO 99/53286 | 10/1999 |
| WO | WO 03/023536 | 3/2003 |
| WO | WO 03/089881 | 10/2003 |
| WO | WO 2004/059139 | 7/2004 |
| WO | WO 2004/082051 | 9/2004 |
| WO | WO 2004/094892 | 11/2004 |
| WO | WO 2005/060482 | 7/2005 |
| WO | WO 2005/086331 | 9/2005 |
| WO | WO 2008/098583 | 8/2008 |

OTHER PUBLICATIONS

"Invitation to Pay Additional Fees" PCT/US2004/031678.
"Notification of Transmittal of the International Search Report and the Written Opinion" PCT/US2004/022736.
U.S. Appl. No. 10/675,014, filed Sep. 30, 2003; titled "Process Device With Vibration Based Diagnostics".
U.S. Appl. No. 10/850,828, filed May 21, 2004; entitled "Wireless Power and Communication Unit for Process Field Devices".
"Notification of Transmittal of the International Search Report" PCT/US00/14798.
Third Office Action from Chinese patent application No. 200580014212.4, dated Dec. 19, 2008.
First Office Action from Chinese Patent Application No. 2005800142124, filed May 5, 2005.
The Official Communication in Application No. 05746241.8 filed May 5, 2005.
Notification on Results of Examining the Invention for Patentability from Russian patent App No. 2006145434, filed May 5, 2005.
USA & METRIC Thread Standards http://www.carrlane.com/catalog/index.cfm/29425071FOB221118070C1C513906103E0B05543B0B012009083C3B285357474A2D020609090C0015312A36515F554A5B.
The International Search Report and Written Opinion in Application No. PCT/US2006/035728, filed Sep. 13, 2006.
International Search Report and Written Opinion of Application No. PCT/US2005/015848, file May 5, 2005.
Second Official Action from Russian Patent Application No. 2006145434, filed May 5, 2005.
Office Action from U.S. Appl. No. 11/028,486, filed Jan. 3, 2005.
Examination Report of the European Patent Office in Application No. 05724190.3, filed Mar. 2, 2005.
$2^{nd}$ Office Action from Chinese Patent App No. 200580014212.4 filed May 5, 2005.
The International Search Report and Written Opinion in Appln No: PCT/US2005/021757, filed Jun. 21, 2005.
The Official Communication in Application No. 2006145434, filed May 5, 2005.
Notification of Transmittal of the International Search Report or the Declaration—PCT/US03/10403.
"Wireless R&D Aims to Boost Traffic", by M. Moore, InTech with Industrial Computing, Feb. 2002, 3 pgs.
"System Checks Faraway Machines' Health", by J. Strothman, InTech with Industrial Computing, Feb. 2002, 1 pg.
"Wireless Management Toolkit XYR 5000", by Honeywell International Inc., Phoenix, Arizona, 3 pgs., Oct. 2003.
"Wireless Analog Input Transmitters XYR 5000", by Honeywell International Inc., Phoenix, Arizona, 4 pgs., Oct. 2003.
"Quad Analog Output Module Installation and User's Manual", by Honeywell International Inc., Phoenix, Arizona, pgs. Ii, iii, iv and 1-12, Dec. 2003.
"Wireless Dual Analog Input Interface Transmitter Installation and User's Manual", by Honeywell International Inc., Phoenix, Arizona, pp. Ii-vi and 7-43, Dec. 2003.
"XYR 5000 Wireless Dual Analog Input Interface, Model Selection Guide", by Honeywell International Inc., Phoenix, Arizona, Dec. 2003.
"Wireless Measure, Monitor & Control", by Accutech, 4 pgs. May 2003.
"Wireless Instrumentation, Multi-Input Field Unit", by Accutech, 2 pgs., Dec. 2003.
"Quad Analog Output Module", by Accutech, 1 pg. Dec. 2003.
3 Pages from Website www.chemicalprocessing.com, Apr. 2004.
4 Pages from Website http://content.honeywell.com/imc/eznews/eznews0403/news.htm, 2004.
First Office Action from Chinese Patent Application No. 200580006438.X, filed Mar. 2, 2005.
Examiner's consultation for European Patent Application 05 724 190.3, filed Mar. 2, 2005.
Notification of Transmittal of the International Search Report and the Written Opinion, PCT/US2007/019636, dated Oct. 1, 2008.
Invitation to Pay Additional Fees and Partial Search Report, PCT/US2007/019396, dated Oct. 7, 2008.
Invitation to Pay Additional Fee and Partial Search Report for PCT/US2007/011428, dated Oct. 8, 2008.
"Notification of Transmittal of the International Search Report and the Written Opinion of the International Searching Authority" in related application PCT/US2009/062152, dated Jun. 2,2010.
High Power Single PSE Controller With Internal Switch, Linear Technology LTC4263-1, pp. 1-20.
First Office Action from related Chinese Patent Application No. 200780018710.5, issued May 12, 2010.

* cited by examiner

US 7,977,924 B2

INDUSTRIAL PROCESS POWER SCAVENGING DEVICE AND METHOD OF DERIVING PROCESS DEVICE POWER FROM AN INDUSTRIAL PROCESS

BACKGROUND

The present disclosure generally relates to industrial process devices for use in industrial process monitoring and control systems. More particularly, the present disclosure relates to an industrial process power scavenging device and method of deriving process device power from an industrial process.

In process settings, control systems monitor and control various aspects of industrial and chemical processes. Generally, a control system communicates with field devices that are coupled to the industrial process. For example, field devices include process sensors that can be coupled to pipes associated with an industrial process. The term "field device" refers to any device that performs a function in a distributed control or process monitoring system, including sensor devices, actuators, other devices, or any combination thereof. The control system receives data related to measured process parameters from the field devices and can use such data to control various aspects of the process.

Some field devices include a process variable sensor. Typically, the process variable sensor receives an input related to a process parameter (such as pressure, temperature, or other parameters). In a particular example, the field device can include an element to cause fluid flow disruption for measuring the process variables. The field device may include a transducer to transform the input into an output having a different form. Such transducers include analytical equipment, processors, pressure sensors, thermistors, thermocouples, strain gauges, flow transmitters, positioners, actuators, solenoids, indicator interfaces, other transducer components, or any combination thereof.

Generally, field devices utilize power to sense the process parameter and to transform the sensed parameter into data that can be transmitted to the control system. Further, transmission of the data to the control system requires additional power. Still more power is needed if the field device includes processing circuitry or a local display panel, such as a light emitting diode indicator panel or liquid crystal display.

SUMMARY

In a particular embodiment, a process device includes a fluid disruption generation element to generate a fluid disruption within a process fluid flowing through a pipe associated with an industrial process and includes a process variable sensor coupled to the fluid disruption generation element to measure a process parameter. The process device further includes a power generation element adapted to generate an electrical output signal in response to the fluid disruption and a power storage component coupled to the power generation element. The power storage component is adapted to accumulate a charge based on the electrical output signal.

In another particular embodiment, a process device for use in a control system associated with an industrial process is disclosed. The process device includes a transmitter housing coupled to a pipe carrying a process fluid that is associated with an industrial process. The process device further includes a process variable sensor adapted to measure a process variable associated with the process fluid. The process device also includes a transducer coupled to the process fluid and adapted to generate an electrical output from the process fluid flowing within the pipe. The process device further includes a power storage component coupled to the transducer and adapted to store a charge based on the electrical output and includes circuitry coupled to the power storage component and to the process variable sensor. The circuitry receives a power supply from the power storage component and provides an output signal related to the process variable.

In still another particular embodiment, a method of deriving process device power from an industrial process is disclosed that includes receiving vibrations related to fluid flow of a process fluid within a pipe associated with an industrial process, sensing a process variable at a process variable sensor associated with the field device, and transmitting data related to the process variable to a control system using a transceiver circuit. The method further includes transforming the vibrations into an electrical current via the transducer and accumulating a charge at a power storage element based on the electrical current. In a particular embodiment, the method includes generating a fluid disruption within the pipe upstream from the transducer.

DETAILED DESCRIPTION OF ILLUSTRATIVE EMBODIMENTS

Figure 1:
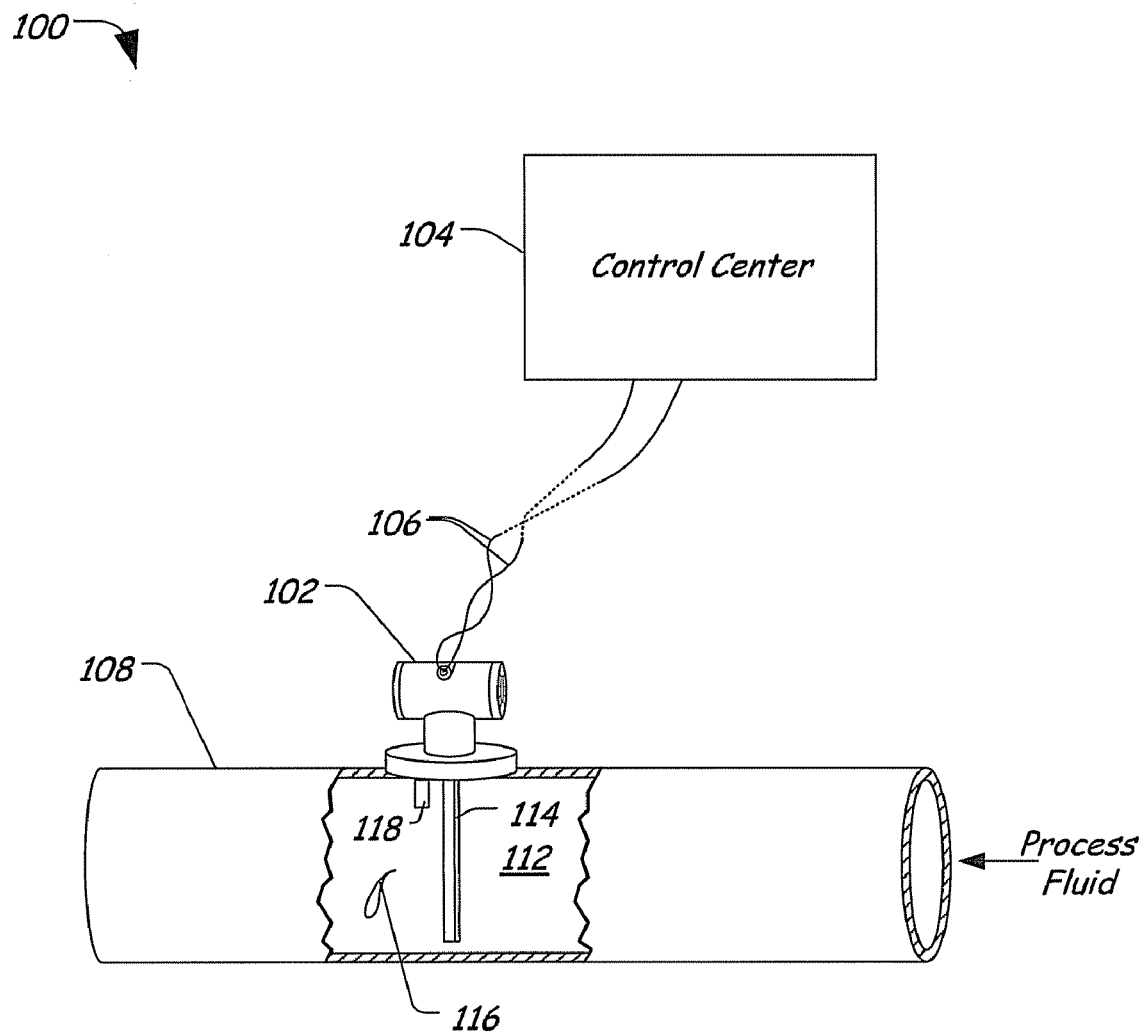
FIG. 1 is a diagram of a particular illustrative embodiment of a process control system including a field device having power generation element to derive power from an industrial process.

FIG. 1 is a diagram of a particular illustrative embodiment of a process control system 100 including a field device 102 having power generation element 118 to derive power from an industrial process. The process control system 100 also includes a control center 104 that is adapted to communicate with the field device 102 via a communications link 106, which may be a wired communications link or a wireless communications link, depending on the particular implementation.

The field device 102 is a process device or process control transmitter device adapted to monitor a process variable parameters, such as pressure, fluid flow rate, temperature, other process variable parameters, or any combination thereof. The field device 102 is coupled to a pipe 108 that carries a process fluid 112. The field device 102 includes a fluid disruption generation element 114, such as a vortex shedding bar or annubar, which is adapted to generate fluid disruption, such as the disruption 116. The field device 102 includes a power generation element 118, which is adapted to transform kinetic energy associated with the fluid disruption 116 into an electrical current that can be used by the field device 102.

In a particular embodiment, the field device 102 can include a battery or a large capacitor that is adapted to accumulate charge based on the electrical current from the power generation element 118. The accumulated charge may be used to provide power for circuitry within the field device 102. In a particular example, a microprocessor, a display interface, other circuitry, or any combination thereof may be powered from the accumulated charge. In general, the power generation element 118 is adapted to harvest energy from the process fluid 112. The harvested energy can be stored at a power storage component, used to power other circuitry, or any combination thereof.

In a particular example, the field device 102 may be adapted to communicate wirelessly with the control center 104. In this example, the field device 102 may derive its operating power from the power generation element 118.

Figure 2:
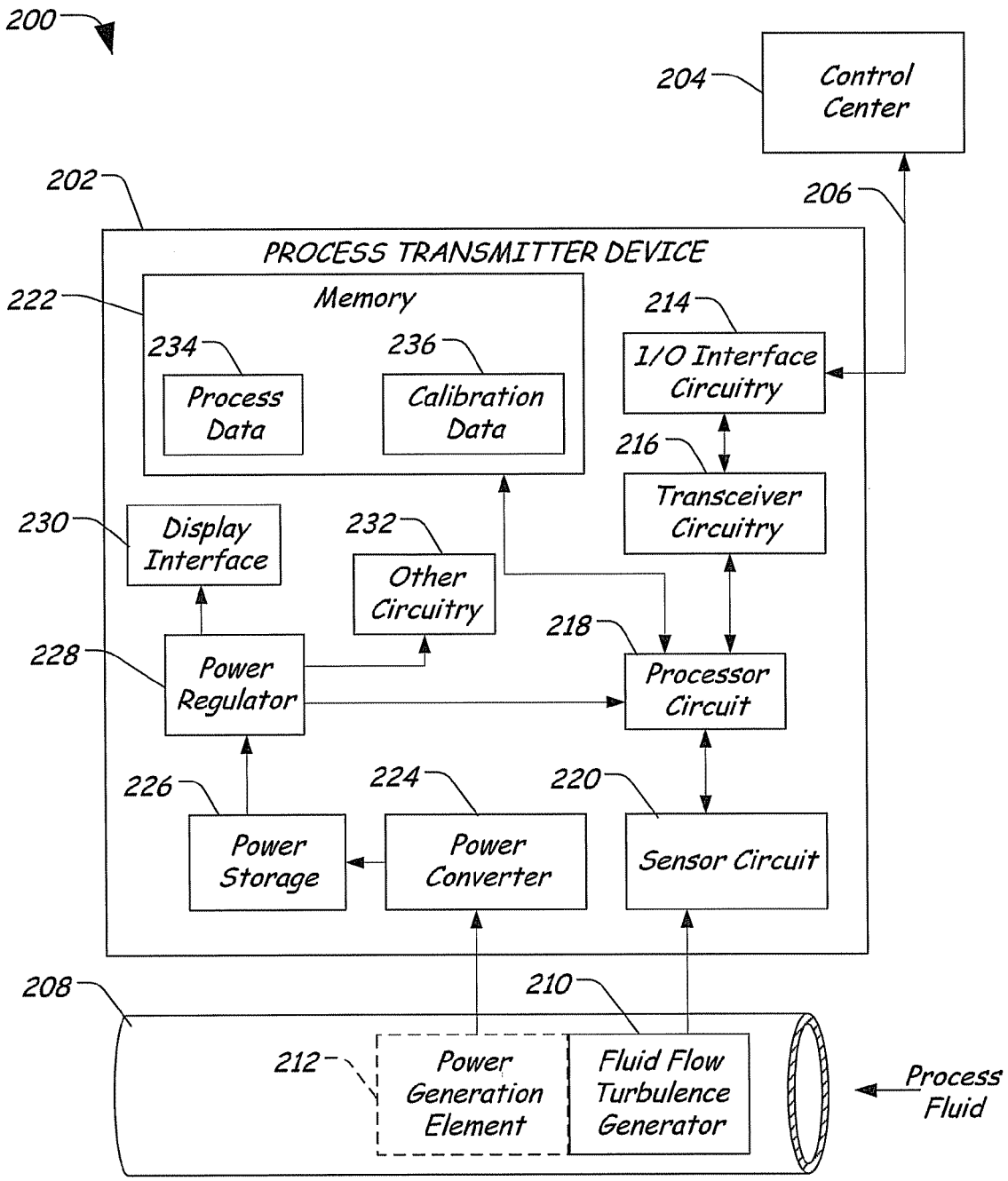
FIG. 2 is a block diagram of second particular illustrative embodiment of a process control system including a field device having a power generation element to derive power from an industrial process.

FIG. 2 is a block diagram of second particular illustrative embodiment of a process control or monitoring system 200 including a process transmitter device 202 that communicates with a control center 204 via a wired or a wireless communications path 206. The process transmitter device 202 is coupled to a pipe 208 that is associated with an industrial process. The pipe 208 carries a process fluid. The process transmitter device 202 is coupled to a fluid flow disruption generator 210 that is positioned within the pipe 208 to generate fluid disruption within the process fluid. In a particular example, the fluid flow disruption generator 210 can be an orifice plate, an annubar, a vortex shedding bar, a Venturi tube, other flow disruptive elements, or any combination thereof. The process transmitter device 202 is also adapted to communicate with a power generation element 212, which may be coupled to the fluid flow disruption generator 210 or which may be positioned relative to the fluid flow disruption generator 210 to receive the fluid disruption. In a particular embodiment, the power generation element 212 is adapted to generate an electrical current from vibrations resulting from the process fluid flowing within the pipe 208, from fluid disruption resulting from the fluid flow disruption generator 210, from movement of the fluid flow disruption generator 210, from pressure pulsations, or any combination thereof.

The process transmitter device 202 is a field device that includes input/output (I/O) interface circuitry 214 adapted to communicate with the control center 204. If the communications path 206 is a wired communications path, the I/O interface circuitry 214 may include a wire connector to physically couple the wiring to the process transmitter device 202. If the communication path 206 is wireless communication path, the I/O interface circuitry 214 can include an antenna for transmission and reception of wireless signals. The process transmitter device 202 also includes transceiver circuitry 216 that is coupled to the I/O interface circuitry 214. The transceiver circuitry 216 is adapted to generate data and to transmit data to and receive data from the control center 204 via the I/O interface circuitry 214.

The process transmitter device 202 further includes a processor circuit 218 that is adapted to control operation of the process transmitter device 202. In a particular example, the processor circuit 218 is adapted to communicate with a sensor circuit 220 and to process measurement information received from the sensor circuit 220. The processor 218 may be adapted to process (groom) or otherwise calibrate the measurement information from the sensor circuit 220 using calibration data 236 stored at a memory 222 and to store the processed measurement data as process data 234 at the memory 222. The processor 218 may also provide the processed measurement data to the transceiver circuitry 216 to send the data to the control center 204 via the I/O interface circuitry 214.

The process transmitter device 202 also includes a power converter 224 that is adapted to receive an electrical current from the power generation element 212. In a particular embodiment, the power converter 224 can include a bridge rectifier and filtering circuit. The power converter 224 provides a rectified power supply to a power storage component 226, which may be a battery, a large capacitor, another charge storage component, or any combination thereof. The process transmitter device 202 includes a power regulator 228 adapted to provide power from the power storage component 226 to a display interface 230, such as a liquid crystal display (LCD) device, a light emitting diode (LED) display interface, other local display components, or any combination thereof. The power regulator 228 may also provide power from the power storage component 226 to the processor circuit 218, to the transceiver circuit 226 (via a link that is not shown), to other circuitry 232, or any combination thereof.

In a particular example, the process transmitter device 202 communicates wirelessly with the control center 204 via a wireless communications path 206. The process transmitter device 202 generates operating power from the power generation element 212, which produces an electrical current from vibrations or other kinetic energy associated with process fluid flowing through the pipe 208. The process transmitter device 202 receives the electrical current at the power converter 224 and accumulates and stores a charge based on the electrical current at the power storage element 226. The process transmitter device 202 uses the power regulator 228 to provide power to the memory 222, the processor circuit 218, the sensor circuit 220, the transceiver circuitry 216, and the I/O interface circuitry 214 to measure a process variable parameter and to communicate data related to the measured process variable parameter to the control center 204 via the wireless communication path 206.

In another particular embodiment, the process transmitter device 202 receives operating power from the control center 204 via a wired communication path, such as the communications path 206. The process transmitter device 202 also derives surplus operating power from the power generation element 212, which is rectified via the power converter 224 and stored at the power storage component 226. The power regulator 228 is adapted to provide the surplus power to the display interface 230 and to other circuitry 232. In a particular example, the surplus power from the power generation element 212 can be used to provide power to the processor circuit 218 for local data processing. In another particular example, the surplus power from the power generation element 212 can be used to provide power to a local display, such as the display interface 230, which can provide a visual display of the process variable data for use by a technician at the process transmitter device 202. The surplus power may be used to perform tests and local on-demand measurements, allowing a technician to interact with the process transmitter device 202 to trigger measurement of the process variable parameter and to receive data related to the measured process variable transmitter via the display interface 230.

Figure 3:
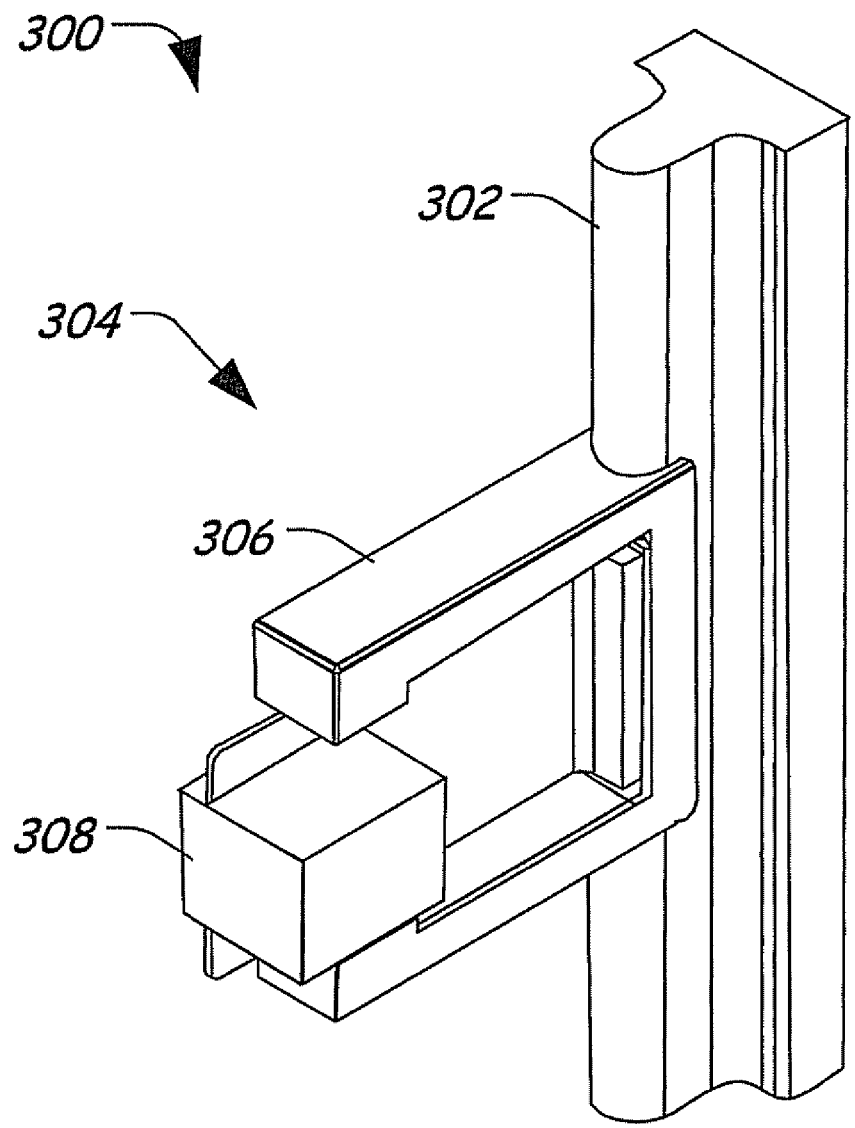
FIG. 3 is a diagram of a particular illustrative embodiment of a power generation system including a fluid flow disruption generator and a power generation element to derive power from fluid disruption.

FIG. 3 is a diagram of a particular illustrative embodiment of a power generation system 300 including a fluid flow disruption generator, such as an annubar 302, and including a power generation element 304. The power generation element 304 includes a u-shaped magnet 306 attached to the annubar 302 and adapted to provide a magnetic field. The power generation element 304 further includes a conductive coil 308 that is adapted to move relative to the u-shaped magnet 306 within the magnetic field in response to vibrations and fluid disruption.

In a particular embodiment, the annubar 302 and the power generation element 304 are positioned within a pipe associated with an industrial process. As process fluid flows around the annubar 302, the annubar 302 disturbs the flow, causing the process fluid to separate and generate small eddies or vortices in the process fluid flow that are shed alternately along and behind each side of the annubar 302. In some instances, the alternating "shedding" fluid flow causes fluctuating pressure that can be detected by a sensor. Additionally, the fluctuating pressure can result in movement of the conductive coil 308 relative to the unshaped magnet 306, inducing current flow within the conductive coil 308. The induced current flow can be provided to a power converter circuit, such as the power converter 224 illustrated in FIG. 2.

In a particular embodiment, the power generation system 304 can be used to generate surplus power, operating power, or any combination thereof. Such generated power may be used to provide power to circuitry within a field device, such as the field device 102 illustrated in FIG. 1 or the process transmitter device 202 illustrated in FIG. 2.

Figure 4:
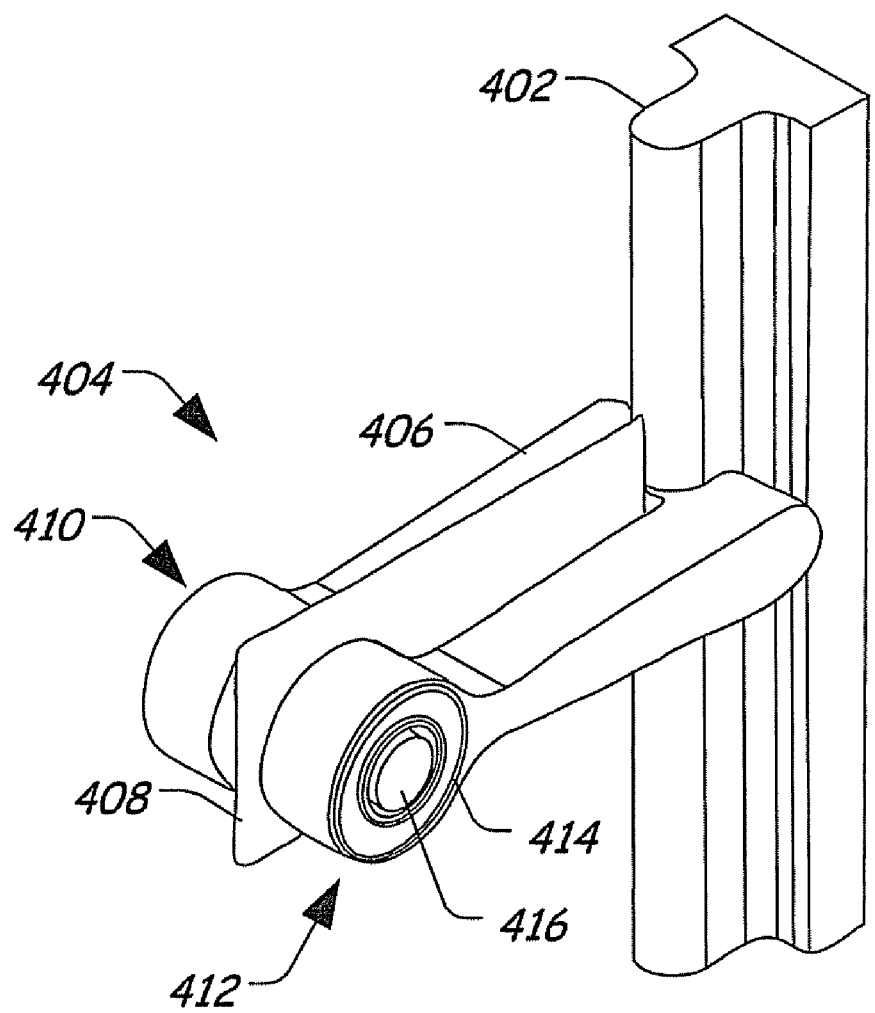
FIG. 4 is a diagram of a second particular illustrative embodiment of a power generation system including a fluid flow disruption generator and a power generation element to derive power from fluid disruption.

FIG. 4 is a diagram of a second particular illustrative embodiment of a power generation system 400 including a fluid flow disruption generator, such as an annubar 402, which may be positioned within a pipe associated with an industrial process. The power generation system 400 further includes a power generation element 404 that is adapted to generate an electrical current in response to fluid disruption caused by the annubar 402. The power generation element 404 includes an attachment portion 406 that is coupled to the annubar 402. The attachment portion 406 includes a vibrating beam 408 sandwiched between a first electrical generator 410 and a second electrical generator 412. The second electrical generator 412 includes a voice coil 414 and a moveable magnet 416 positioned to move along an axis of the voice coil 414 to induce an electrical current with the voice coil 414. The first electrical generator 410 may also include a voice coil and a moveable magnet. In an alternative embodiment, the first electrical generator 410 and the second electrical generator 412 may share the voice coil 414 and the moveable magnet 416, which may be adapted to move through an opening (not shown) in the vibrating beam 408.

In a particular embodiment, fluid vortices caused by the flow of process fluid around the annubar 402 causes the vibrating beam 408 to vibrate. The motion of the vibrating beam 408 causes the moveable magnet 416 to move relative to the voice coil 414, inducing electrical current to flow in the voice coil 414. In a particular example, the voice coil 414 may be coupled to a power converter and a power storage element within a process device housing, such as a housing associated with the process transmitter device 202 illustrated in FIG. 2.

Figure 5:
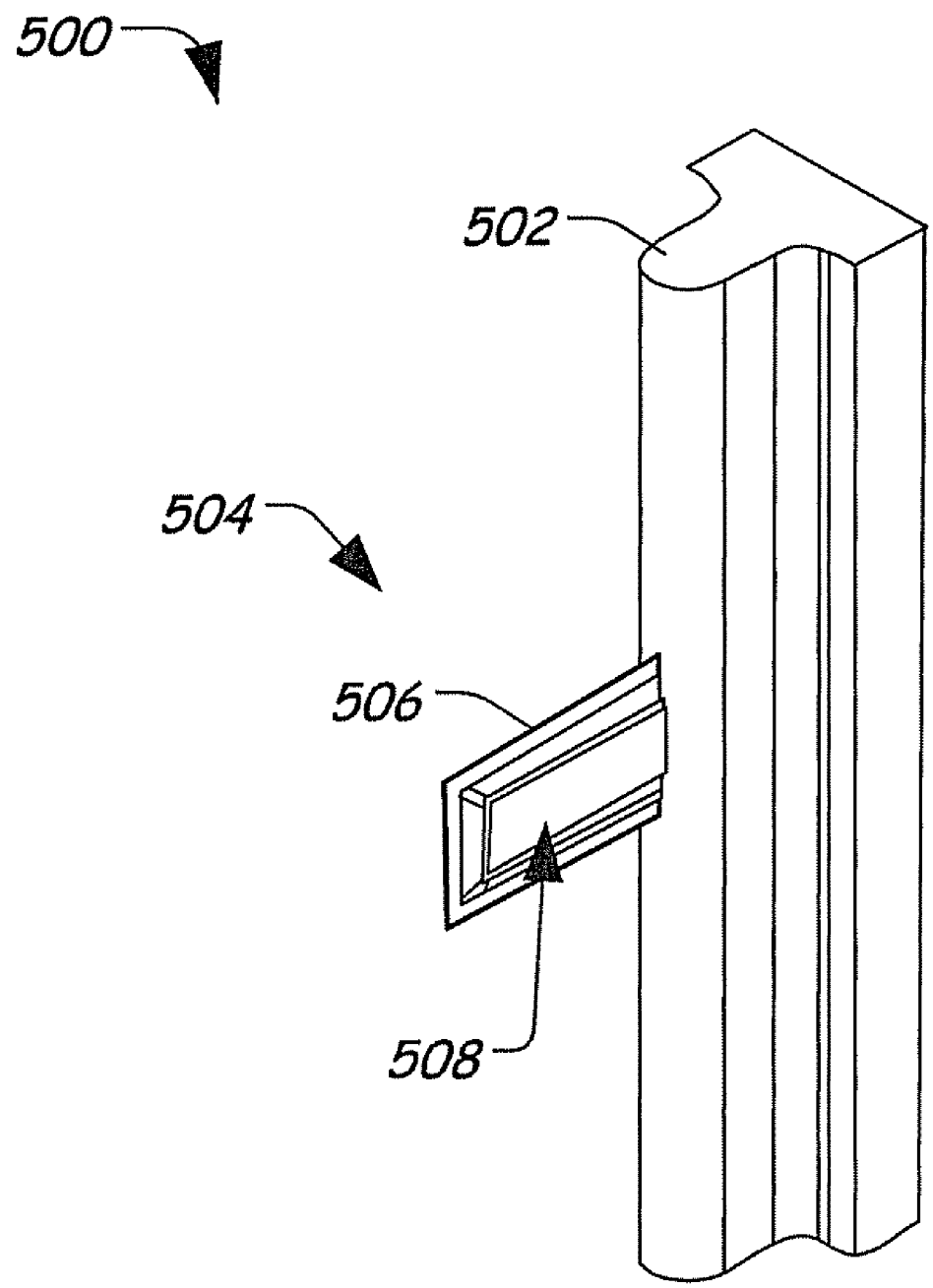
FIG. 5 is a diagram of a third particular illustrative embodiment of a power generation system including a fluid flow disruption generator and a power generation element to derive power from fluid disruption.

FIG. 5 is a diagram of a third particular illustrative embodiment of a power generation system 500 including a fluid flow disruption generator 502 and including a power generation element 504. The power generation element 504 includes a molded package 506 adapted to house a piezoelectric crystal beam, which is cantilevered inside of the package 506. The piezoelectric crystal beam is generally indicated at 508. In a particular embodiment, the molded package 506 may be formed from stainless steal, and the piezoelectric crystal beam 508 may be positioned within the molded package 506 and sandwiched between thin rubber pads (not shown). The power generation element 504 may be laser welded to the fluid flow disruption generator 502. In a particular embodiment, the power generation element 504 vibrates in response to fluid disruption. Vibration of the power generation element 504 causes the piezoelectric crystal beam 508 within the molded package 506 to generate an electrical current. In a particular example, the electrical current from the piezoelectric crystal beam 508 may be provided to a power converter and to a power storage element within a process transmitter, such as the power converter 224 and the power storage component 226 of the process transmitter device 202 illustrated in FIG. 2.

Figure 6:
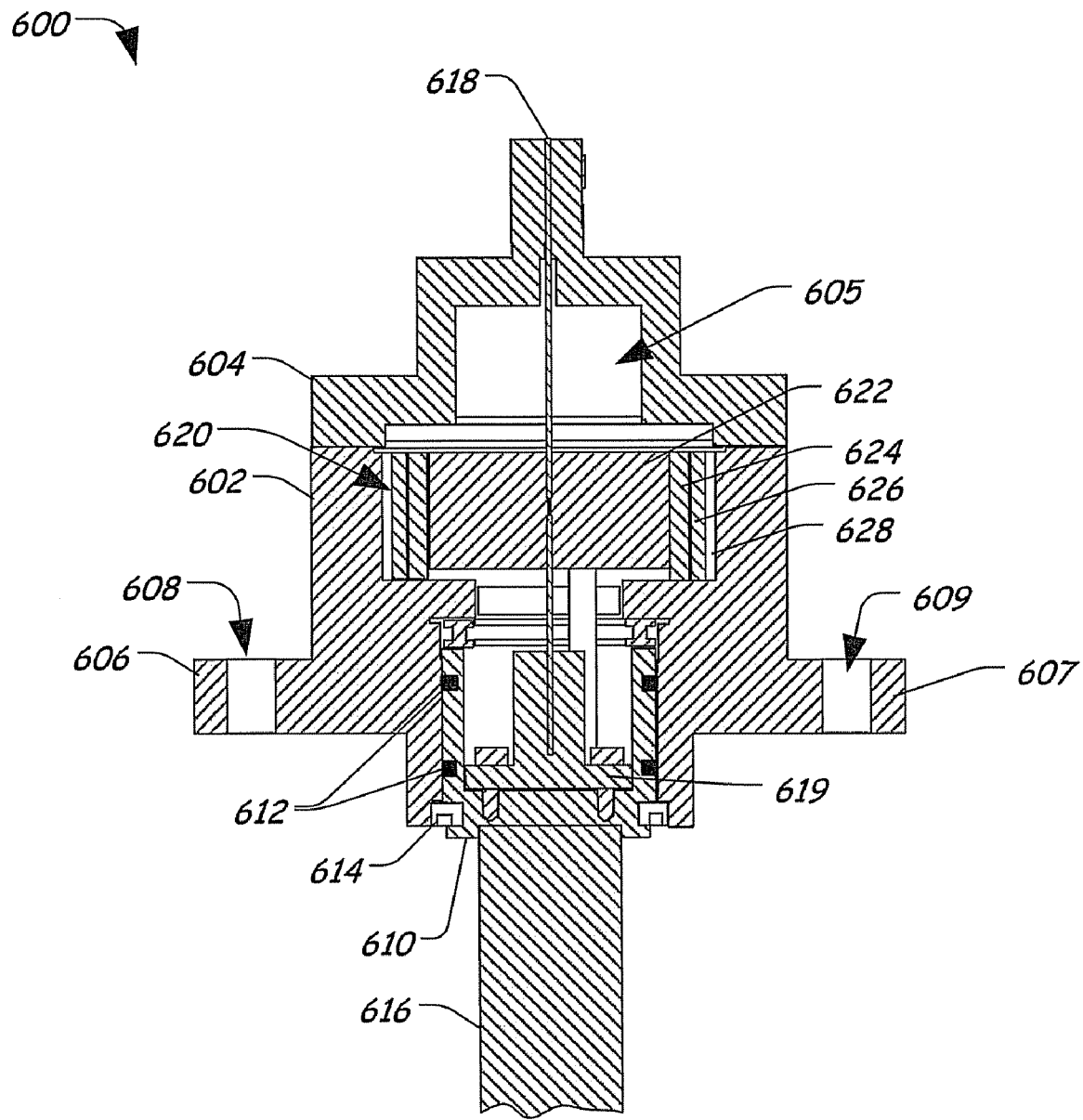
FIG. 6 is a cross-sectional diagram of a particular embodiment of a power generation system including a process flow meter device having a disruption generating shedding bar and an associated power generation element.

FIG. 6 is a cross-sectional diagram of a particular embodiment of power generation system including a process flow meter device 600 having a disruption-generating element, such as an annubar 616. The process flow meter device 600 also includes a power generation element 620. The process flow meter device 600 is adapted to communicate with a fluid flow of an industrial process to determine a fluid flow rate. The process flow meter device 600 includes a housing 602 that is coupled to a housing cover 604. The housing 602 and the housing cover 604 define a cavity 605 adapted to house the power generation element 620 and other circuitry (not shown). The housing 602 includes flange portions 606 and 607 with respective openings 608 and 609, which are adapted to receive fasteners (such as bolts) to secure the housing 602 to a structure associated with an industrial process, such as a pipe. The process flow meter device 600 further includes an annubar mounting union 610 that is coupled to the housing 602 and o-ring seals 612 to prevent fluid flow around the annubar mounting union 610 into the cavity 605. The process flow meter device 600 also includes a high pressure rotary seal 614 to further isolate the cavity 605 from process fluid and to prevent process fluid from escaping the pipe at a coupling between the process flow meter device 600 and the pipe, such as the pipe 108 illustrated in FIG. 1.

The process flow meter device 600 includes a twist spring 618 that is coupled to a twist spring anchor 619. The twist spring 618 may be used to adjust a tension associated with the power generation element 620, which may adjust an oscillating frequency, a damping tension, a spring tension, or other force applied to a moveable magnet 622. The power generation element 620 includes the moveable magnet 622 adapted to move along an axis associated with an inner voice coil 624 and an outer voice coil 626 in response to vibrations received from the annubar 616. The power generation element 620 is disposed within a power generation room 628 of the cavity 605 and is adapted to generate electrical current in the inner and outer voice coils 624 and 626 in response to vibrations received from the annubar 616. In a particular embodiment, the electrical current may be provided to a power converter within the housing 602 and may be stored in a power storage component, such as the power converter 224 and the power storage component 226 illustrated in FIG. 2.

Figure 7:
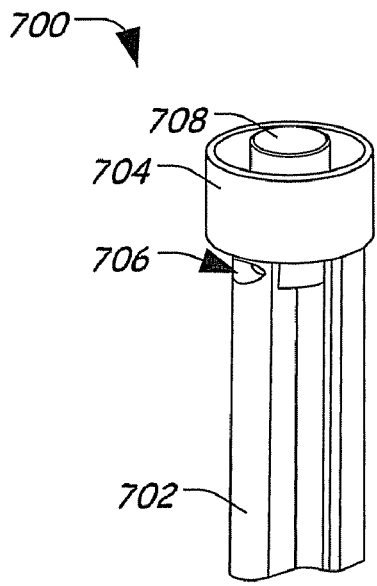
FIG. 7 is a diagram of a particular embodiment of a portion of a power generation system including a process flow meter device having a fluid disruption generating element with an opening to a power generating turbine adapted to derive power from a process fluid flow.

FIG. 7 is a diagram of a particular embodiment of a power generation system 700 of a process flow meter device including a differential pressure generating bar, such as an annubar 702, having an opening 706 to a power generating turbine 710 (illustrated in FIGS. 8 and 9) adapted to derive power from a process fluid flow. The power generation system 700 includes an annubar union 704 adapted to couple to a process flow meter device housing (such as the housing 602 illustrated in FIG. 6). The power generation system 700 also illustrates a portion of an electrical current generator 708. In a particular example, the portion of the electrical current generator 708 may include a power converter circuit (such as the power converter 224 illustrated in FIG. 2).

In a particular embodiment, process fluid flows into the opening 706 in the annubar 702 and turns the power-generating turbine 710 to produce an electrical current that can be provided to the electrical current generator 708 to provide power to provide operating power to circuitry associated with the process flow meter device.

Figure 8:
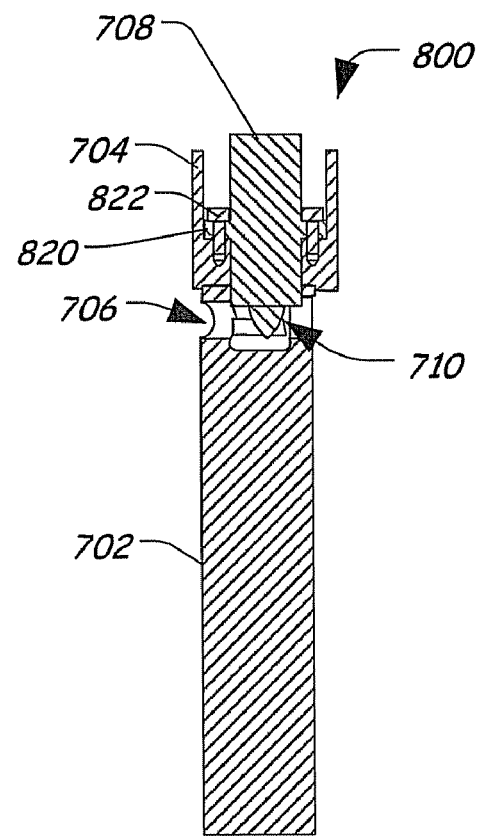
FIG. 8 is a cross-sectional view of the portion of the process flow meter device including the fluid disruption generating element of FIG. 7.

FIG. 8 is a cross-sectional view 800 of the power generation system 700 of the process flow meter device including a differential pressure generating bar, such as the annubar 702 illustrated in FIG. 7. The power generation system 700 includes the opening 706 to the power-generating turbine 710, which is coupled to the electrical current generator 708. The electrical current generator 708 includes a flange portion 820 that is coupled to the annubar union 704 via a fastener 822, such as a threaded bolt. In a particular embodiment, process fluid flows through the opening 706 and around the power-generating turbine 710, causing the power-generating turbine 710 to turn. The turning of the power-generating turbine 710 provides kinetic energy to the electrical current generator 708, which converts the kinetic energy into an electrical current.

Figure 9:
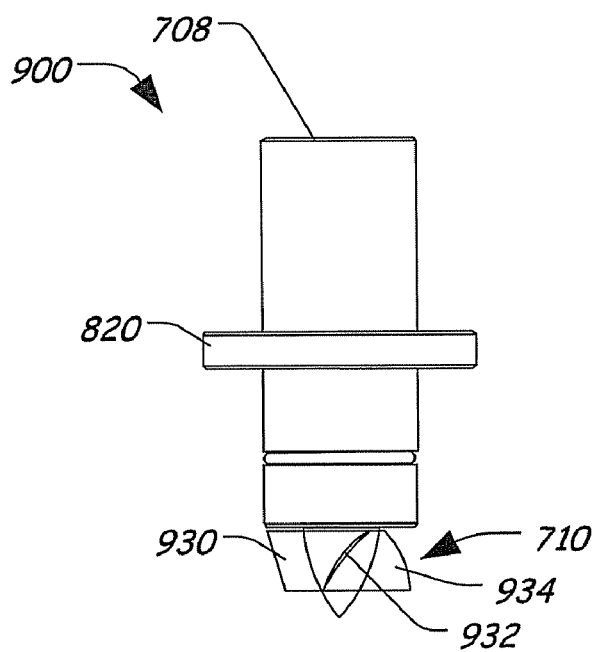
FIG. 9 is a diagram of a particular embodiment of a power generation system including a turbine to derive power from fluid flow.

FIG. 9 is a diagram of a particular embodiment of a power generation system 900 including the power-generating turbine 710 and the electrical current generator 708 with the associated flange portion 820. The power-generating turbine 710 includes a first turbine blade 930, a second turbine blade 932, and a third turbine blade 934, which are adapted to turn the power-generating turbine 710 in response to the process fluid flowing through an opening, such as the opening 706 illustrated in FIGS. 7 and 8.

In a particular example, the process fluid flows around the power-generating turbine 710 and the first, second, and third turbine blades 930, 932, and 934 cause the power-generating turbine 710 to rotate. Such rotation represents kinetic energy, which can be converted to an electrical current by the electrical current generator 708. The electrical current can be provided to a power converter and a power storage component, such as the power converter 224 and the power storage component 226 illustrated in FIG. 2.

Figure 10:
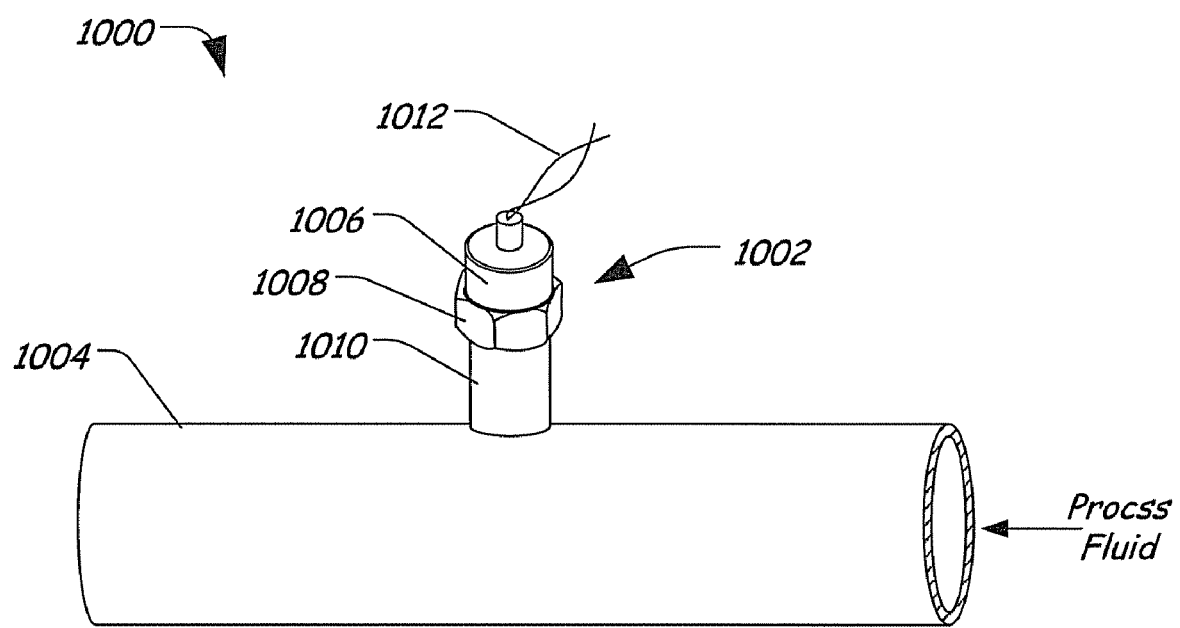
FIG. 10 is a diagram of another particular embodiment of a power generation system including a pressure transducer coupled to a process pipe.

FIG. 10 is a diagram of a power generation system including a power generation device 1002 that is coupled to a process pipe 1004. The power generation device 1002 includes a pressure transducer 1006 that is coupled to a pipe extension 1010 via a threaded fastener 1008. The pressure transducer 1006 is adapted to convert fluid pressure pulses from process fluid within the process pipe 1004 into an electrical current that can be carried by the wires 1012. In a particular example, the wires 1012 can be coupled to a power converter and/or a power storage component, such as the power converter 224 and the power storage component 226 illustrated in FIG. 2.

In a particular example, the pipe extension 1010 may be a resonant pipe adapted to direct acoustic noise associated with the process fluid to the power generation device 1002. In this instance, the pressure transducer 1006 can be adapted to receive the acoustic noise and to generate an electrical current from pressure fluctuations associated with the acoustic noise. In a particular example, acoustic pulsation frequencies of interest may be in a range of 60 to 80 hertz. In another particular example, the pipe extension may be configured to take advantage of standing waves that can occur. In particular, the length (L) of the pipe extension 1010 may be selected to focus the noise within a desired frequency range to which the power generation device 1002 may be tuned. In a particular example, the frequency (F) of the acoustic vibrations is related to the length (L) of the pipe extension by the speed of sound ($V_{sound}$), and the desired length L can be determined according to the following equation:

$$L = V_{sound}/F \qquad \text{(Equation 1)}$$

Standing waves within the process pipe may cause the acoustic noise to fluctuate. Such fluctuations can be translated into an electrical current by a piezoelectric element, by a coil/magnet system where the coil and the magnet move relative to one another, by another transducer, or any combination thereof.

Figure 11:
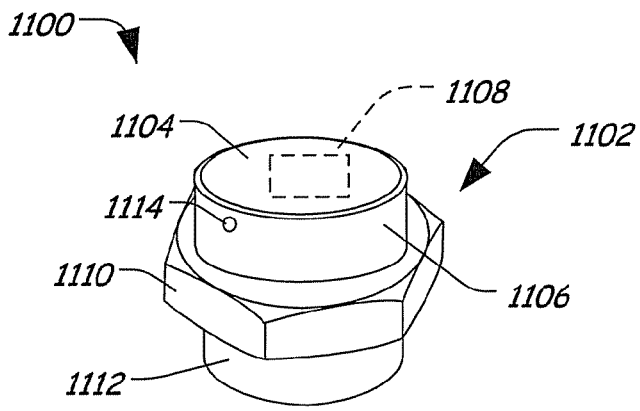
FIG. 11 is a top plan view of still another particular illustrative embodiment of a power generation system including a pressure transducer.

FIG. 11 is a top plan view of a second particular illustrative embodiment of a power generation system 1100. The power generation system 1100 includes a power generation device 1102 having a diaphragm 1104 that is adapted to operate as a spring. The power generation device 1102 also includes an electrical current generator 1108 disposed within a housing 1106 of the power generation system 1100. The housing 1106 includes a pipe thread portion 1112 and a nut portion 1110 that can be used to attach the housing 1106 to a pipe. The housing 1106 also includes a high-pressure opening 1114.

Figure 12:
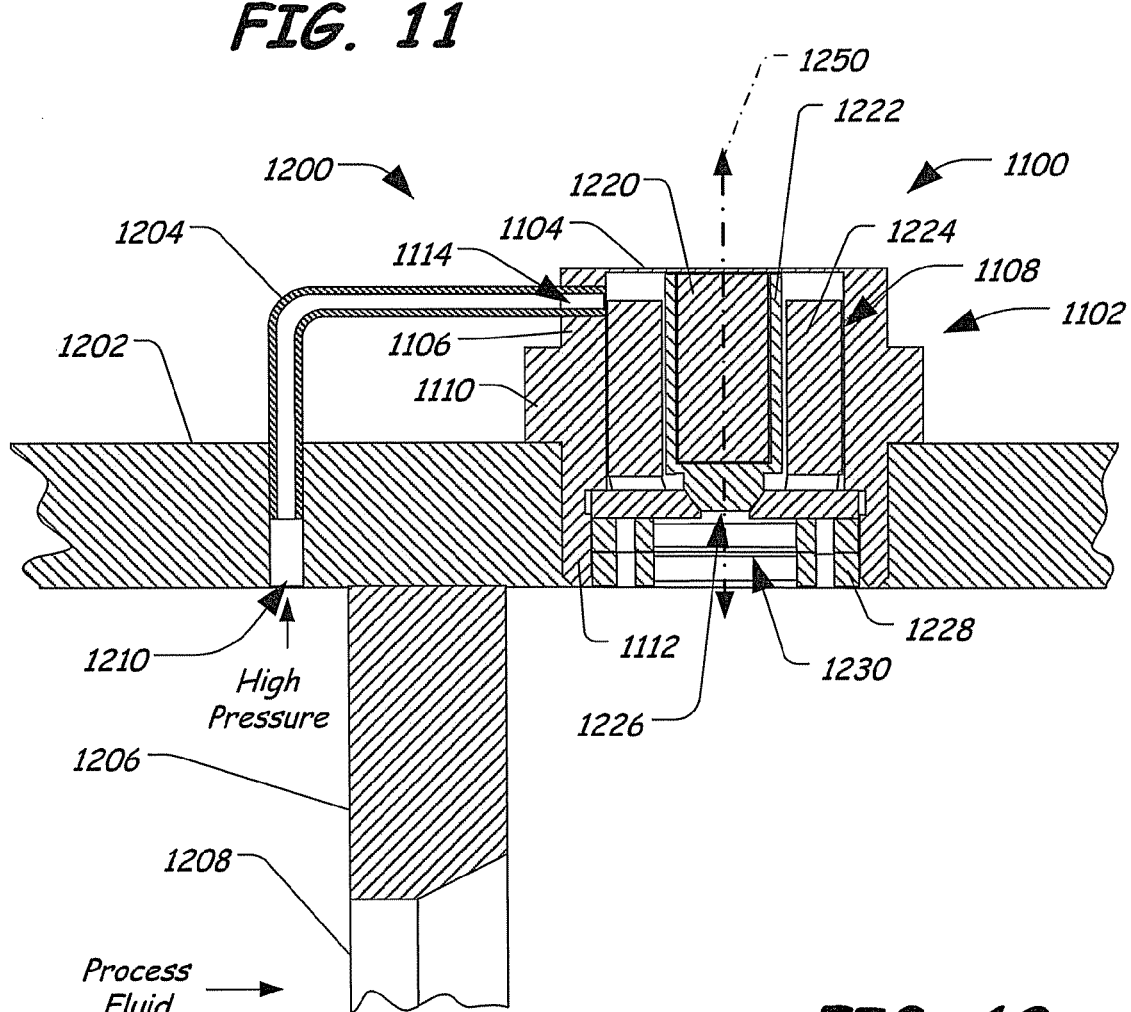
FIG. 12 is a cross-sectional view of the power generation system of FIG. 11.

FIG. 12 is a cross-sectional view 1200 of the power generation system 1100 of FIG. 11. The power generation system 1100 includes the housing 1106 having a pipe thread portion 1112 and a nut portion 1110. The power generation system 1100 is coupled to a pipe 1202 that carries process fluid. The pipe 1202 includes an orifice plate 1206 that has an opening (orifice) through which the process fluid can flow. The pipe 1202 also includes a high-pressure opening 1210 that is coupled to a high-pressure opening 1114 of the power generation system 1100 via a tube 1204. The power generation system 1100 further includes a diaphragm 1104 and the electrical current generator 1108. The electrical current generator 1108 includes a central magnet 1220 within a magnet housing 1222 and includes a voice coil 1224 around the central magnet 1220 and the magnet housing 1222. The pipe thread portion 1112 extends through a wall of the pipe 1202 and includes a lock nut 1228 adapted to mate to the pipe 1202. The lock nut 1228 surrounds a fluid cavity 1230 that extends to a valve 1226, which is coupled to the central magnet 1220 via the magnet housing 1222.

In a particular embodiment, the power generation system 1100 is coupled to a pipe at a low-pressure side of an orifice plate 1206 within a pipe 1202 that carries an industrial process fluid. The high-pressure opening 1114 is coupled to the high-pressure side of the orifice plate 1206 via a tube 1204 and a high-pressure opening 1210. In a first state, the diaphragm 1104 causes the magnet 1220 and the magnet housing 1222 to move downward to close the valve 1226. When process fluid pressure builds up to a particular level, the fluid pressure overcomes the downward force of the diaphragm 1104. The fluid pressure pushes the central magnet 1220 upward until pressure is vented at the valve 1226 via the low-pressure opening 1230. The low-pressure valve 1226 closes again, and the electrical current generator 1108 repeats the process. The movement of the central magnet 1220 results in the opening and the closing of the valve 1226 as the central magnet 1220 is translated along the axis 1250 of the voice coil 1224, inducing an electrical current to flow within the voice coil 1224. In general, the power generation system 1100 can be located outside of the pipe 1202 as shown in FIG. 12. In another particular embodiment, the power generation system 1100 can be located within a process pipe 1202.

Figure 13:
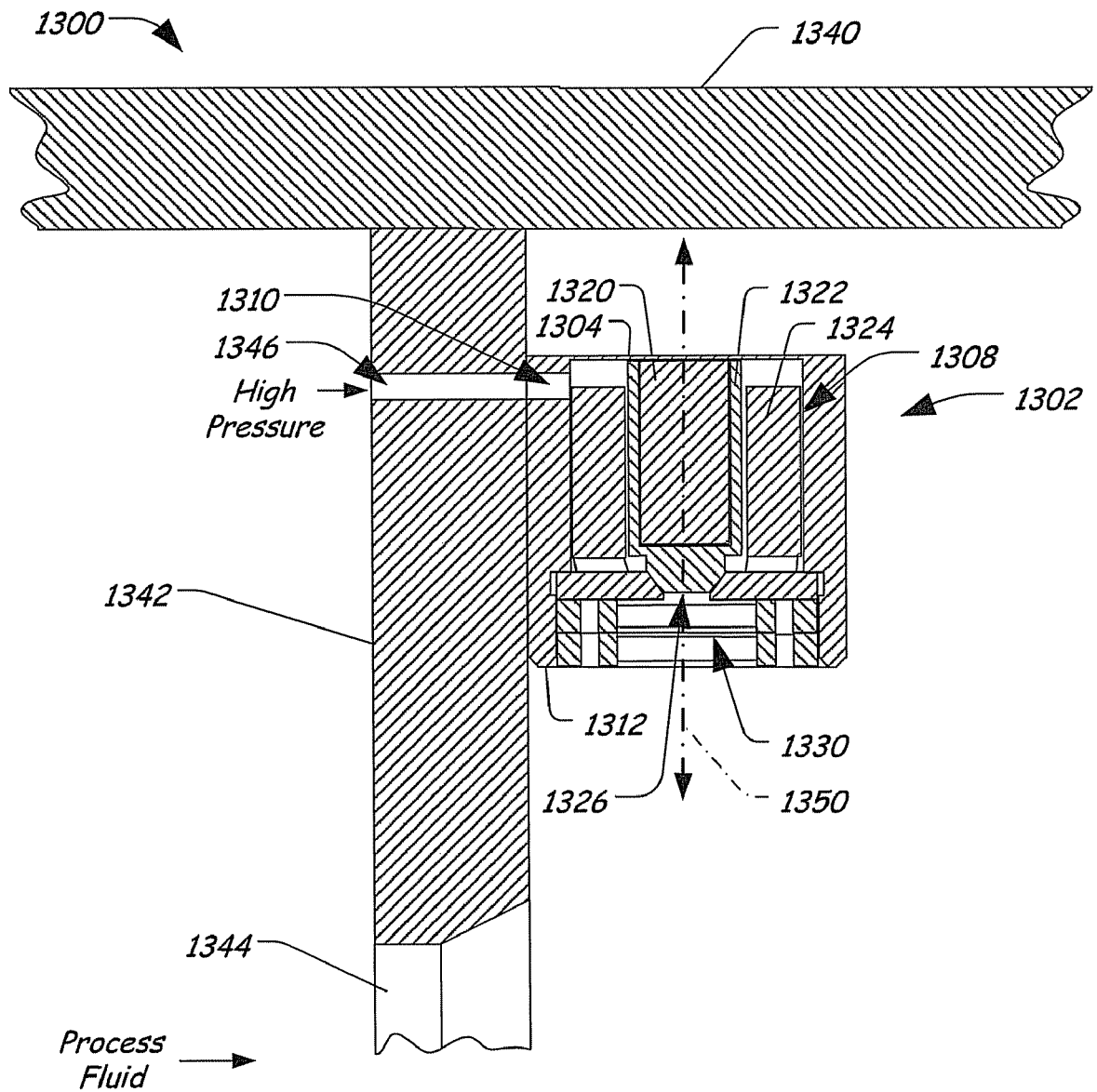
FIG. 13 is a cross-sectional diagram of a particular embodiment of a power generation system coupled to an orifice plate within a pipe.

FIG. 13 is a cross-sectional diagram of a particular embodiment of a power generation system 1300. The power generation system 1300 includes a power generator 1302 that is coupled to an orifice plate 1342. The orifice plate 1342 is positioned within a pipe 1340 that carries process fluid. The orifice plate 1342 includes an opening (orifice) 1344 through which the process fluid can flow. The orifice plate 1342 also includes a high-pressure opening 1346 that extends through the orifice plate to a high-pressure opening 1310 of the power generator 1302. The power generator 1302 includes a diaphragm 1304 and an electrical current generator 1308. The electrical current generator 1308 includes a central magnet 1320 within a magnet housing 1322 and includes a voice coil 1324 around the central magnet 1320 and the magnet housing 1322. The pipe thread portion 1312 surrounds a fluid cavity 1330 that extends to a valve 1326, which is coupled to the central magnet 1320 via the magnet housing 1322.

In a particular embodiment, the power generator 1302 is coupled to the orifice plate 1342 and is adapted to receive process fluid pressure on a low-pressure side of the orifice plate 1342. Fluid pressure pulses push against the valve 1326, causing the central magnet 1320 and the magnet housing 1322 to move relative to the voice coil 1324, inducing an electrical current to flow in the voice coil 1324. The diaphragm 1304 resists the motion of the magnet 1320 and the magnet housing 1322 and pushes the magnet 1320 downward to close the valve 1326. When process fluid pressure builds up to a particular level, the central magnet 1320 is pushed upward until pressure is vented past the vale 1326 through the low pressure opening 1330, and the diaphragm 1304 causes the magnet 1320 and the magnet housing 1322 to move downward to close the valve 1326. The low-pressure opening 1330 provides a pressure vent to equalize pressure and allow the diaphragm 1320 to close the valve 1326. The resulting operation of the power generation device 1302 results in the opening and closing of the valve 1326 to translate the central magnet 1320 along a central axis 1350 of the voice coil 1324 in response to fluid pressure pulses. Translation of the central magnet 1320 relative to the voice coil 1324 induces electrical current to flow within the voice coil 1324.

Figure 14:
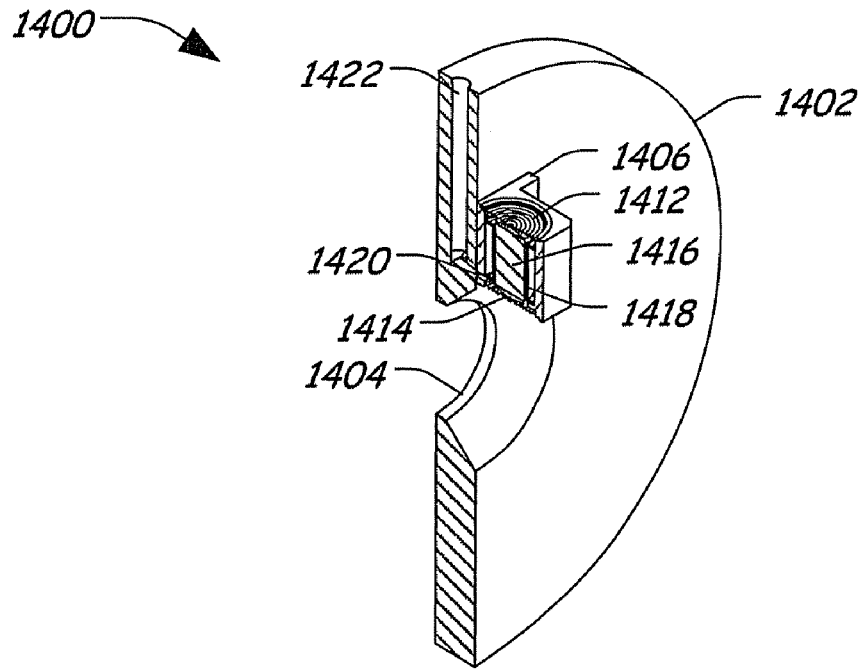
FIG. 14 is a diagram of another particular illustrative embodiment of a power generation system including an orifice plate and an associated power generation element.

FIG. 14 is a diagram of another particular illustrative embodiment of a power generation system 1400 including an orifice plate 1402 and an associated power generation element 1406. The orifice plate 1402 may be positioned within a pipe of an industrial process to create a differential pressure. The orifice plate 1402 includes an opening or orifice 1404, and the power generation element 1406 is positioned adjacent to the opening 1404. The power generation element 1406 includes a first diaphragm 1412 and a second diaphragm 1414. The power generation element 1406 further includes a fixed voice coil 1418 and a movable magnet 1416 sandwiched between the first and second diaphragms 1412 and 1414. The power generation element 1406 includes a wire opening 1420 adapted to couple to a wire opening 1422 within the orifice plate 1402. In a particular example, wires are coupled to the voice coil 1418 and threaded through the wire openings 1420 and 1422 to route the wiring to a power storage element external to the pipe.

In a particular example, the orifice plate 1402 represents a fluid flow obstruction that produces differential fluid pressure and fluid flow disruption within a process fluid. The differential fluid pressure and/or fluid flow disruption apply time-varying pressure to the first and second diaphragms 1412 and 1414, causing the magnet 1416 to move up and down relative to the voice coil 1418. Such movement of the magnet 1416 induces current flow within the voice coil 1418, which may be carried by wires extending through the wire openings 1420 and 1422 to a power storage element.

Figure 15:
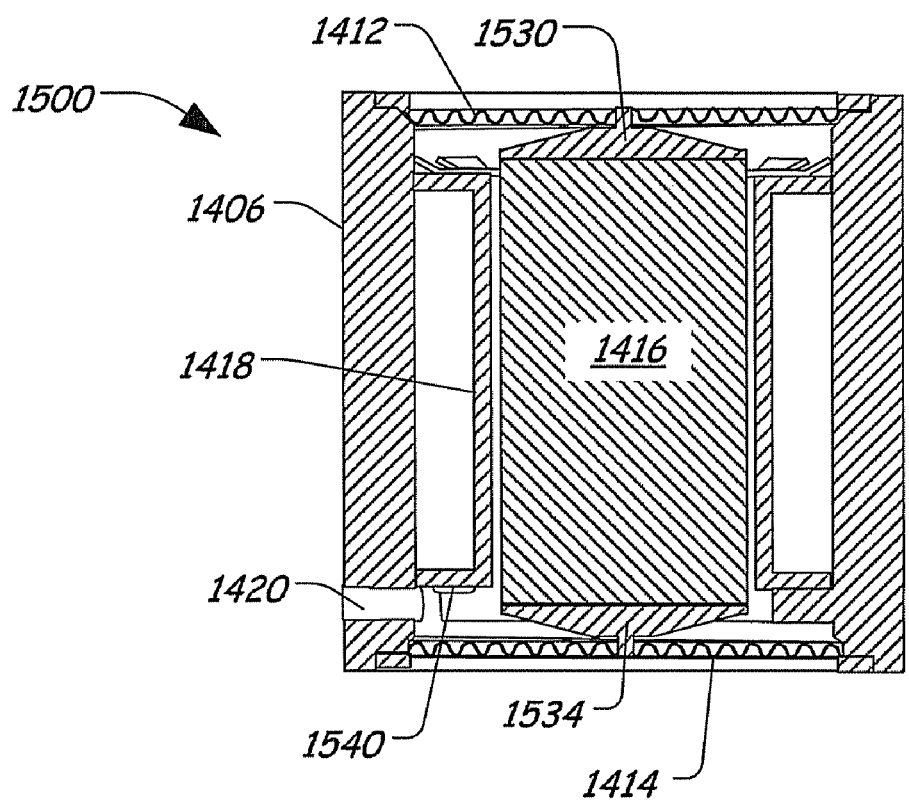
FIG. 15 is a cross-sectional diagram of the power generation element of FIG. 14.

FIG. 15 is a cross-sectional diagram 1500 of the power generation element 1406 illustrated in FIG. 14. Further, the power generation element 1406 includes a first diaphragm 1412, a second diaphragm 1414, and a magnet 1416 sandwiched between the first and second diaphragms 1412 and 1414. The power generation element 1406 further includes a voice coil 1418, which is positioned around the magnet 1416. The magnet 1416 includes a first magnet holder 1530 and a second magnet holder 1534, which may be coupled to the magnet 1416 via an anaerobic epoxy. The power generation element 1406 also includes a wire opening 1420 and a wire rivet 1540 for fixing wires to the voice coil 1418 to harvest energy from movement of the magnet 1416 relative to the voice coil 1418.

In a particular embodiment, the first magnet holder 1530 and the second magnet holder 1534 may be laser welded to the first and second diaphragms 1412 and 1414, respectively. In another particular embodiment, the power generation element 1406 may be positioned relative to a Venturi tube or another differential pressure generating element, such as an annubar.

Figure 16:
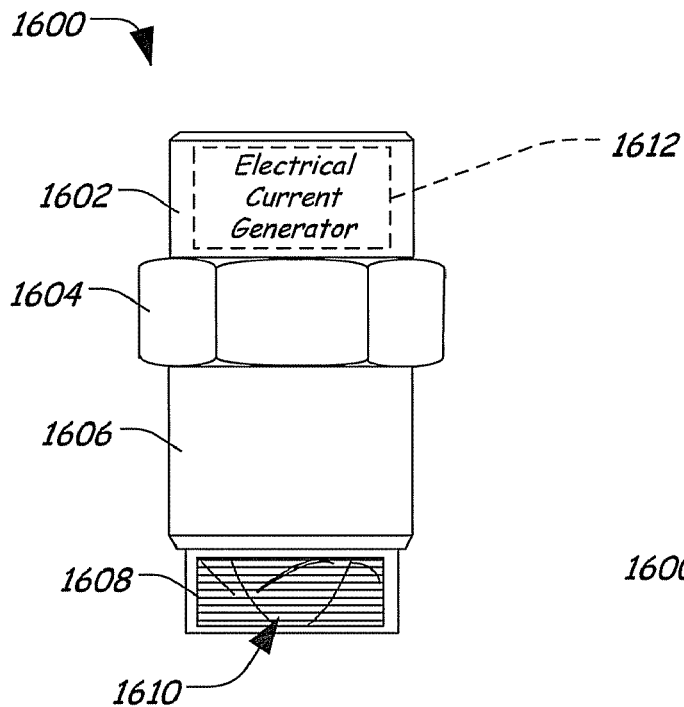
FIG. 16 is a diagram of another particular illustrative embodiment of a power generation system including a turbine to derive power from fluid flow.

FIG. 16 is a diagram of a third particular illustrative embodiment of a power generation system 1600 including a turbine 1610 to derive power from fluid flow. The power generation system 1600 includes a housing 1602 that includes a nut portion 1604 and a pipe portion 1606. The pipe portion 1606 includes a fluid opening 1608 to allow access by the process fluid to the turbine 1610. The housing 1602 further includes an electrical current generator 1612 that is coupled to the turbine 1610 to convert rotational energy from the turbine 1610 into an electrical current that can be used to provide power to various circuit components of a process transmitter device, such as the process transmitter device 202 illustrated in FIG. 2.

Figure 17:
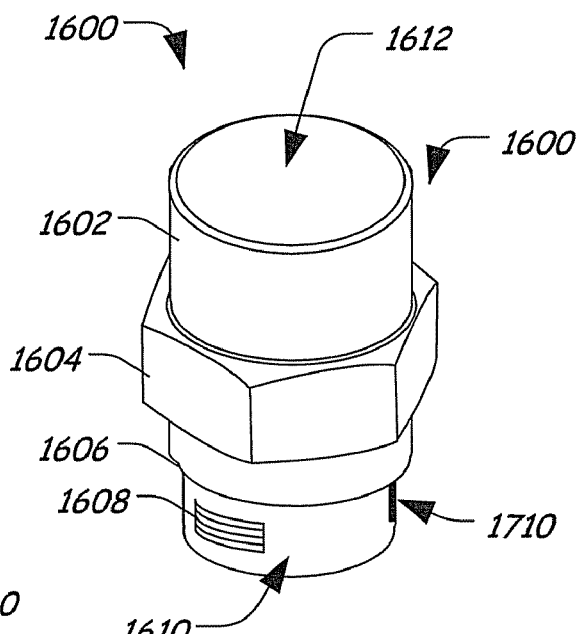
FIG. 17 is a top plan view of the power generation system of FIG. 16.

FIG. 17 is a top plan view 1700 of the power generation system 1600 of FIG. 16. The power generation system 1600 includes the housing 1602 having a nut portion 1604 and a pipe portion 1606. The housing 1610 also includes the electrical current generator 1612. The pipe portion 1606 includes the fluid opening 1608 to allow fluid access to the turbine 1610. The pipe portion 1606 further includes a second opening 1710 to allow the process fluid to flow through the fluid opening 1608, around the turbine 1610, and through the second opening 1710.

Figure 18:
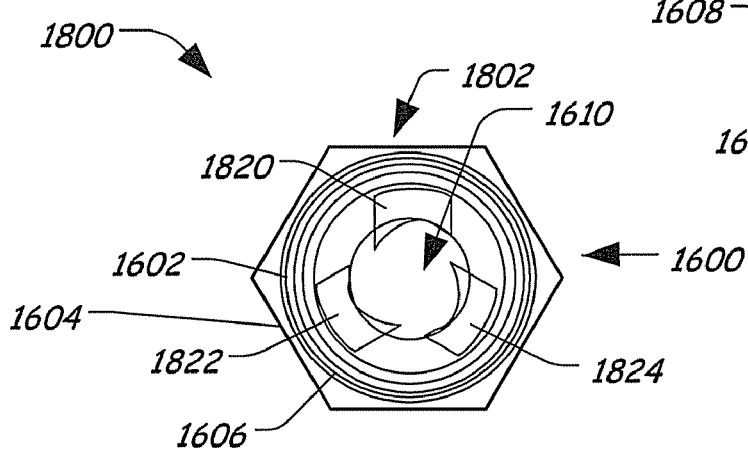
FIG. 18 is a bottom view of the power generation system of FIG. 16.

FIG. 18 is a bottom view 1800 of the power generation device 1600 of FIG. 16. The bottom view 1800 includes the nut portion 1604 and the pipe portion 1606 of the housing 1602. The pipe portion 1606 defines an opening 1802 sized to fit the turbine 1610. The turbine 1610 includes a first blade 1820, a second blade 1822, and a third blade 1824 adapted to rotate the turbine 1610 in response to the process fluid flow.

In a particular embodiment, the turbine 1610 can be positioned within a process pipe such that the opening 1608 and the second opening 1710 are oriented to allow process fluid to flow around the turbine 1610. The turbine 1610 rotates in response to the process fluid flow. The rotation of the turbine 1610 produces kinetic energy that can be converted into an electrical current by the electrical current generator 1612. The electrical current may be stored at a power storage component, such as the power storage component 226 illustrated in FIG. 2. Alternatively, the electrical current may be used to power circuitry that is coupled to the power generation device 1600, including, for example, transceiver circuitry adapted to communicate with a control system and local interface circuitry adapted to provide a local reading related to the process fluid, such as a flow rate, a pressure reading, other data, or any combination thereof.

Figure 19:
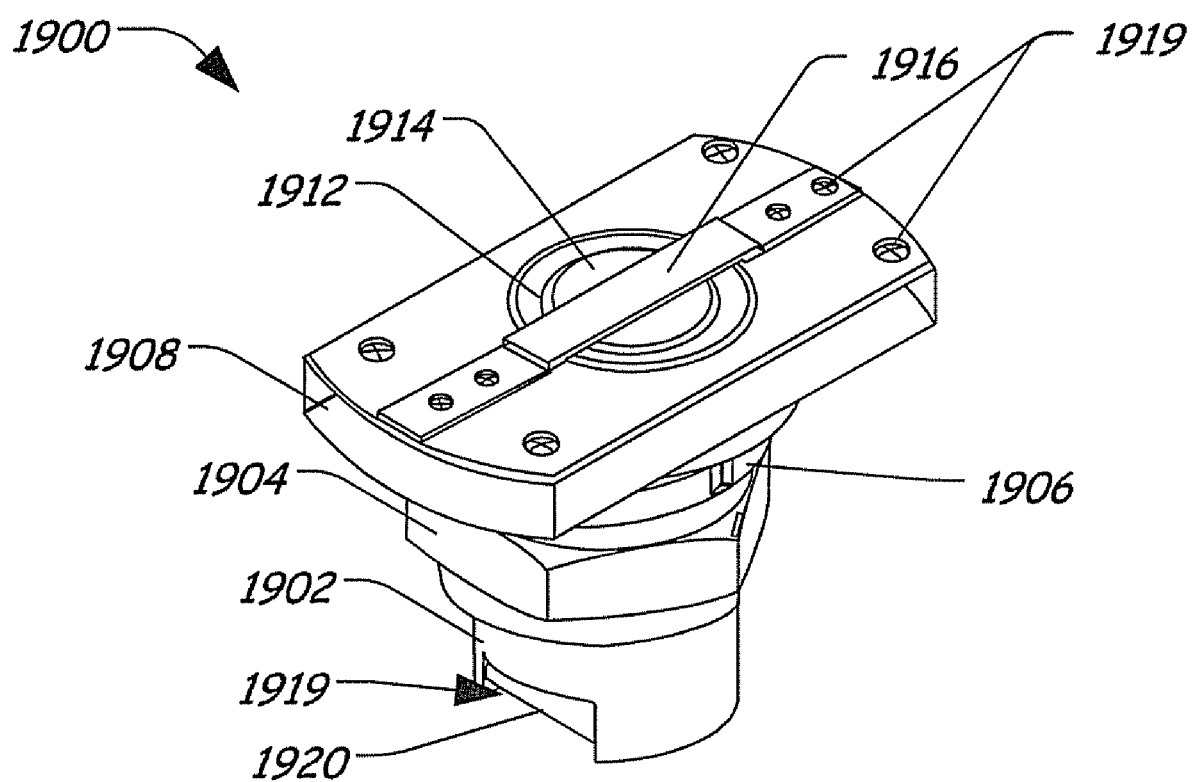
FIG. 19 is a diagram of yet another particular illustrative embodiment of a power generation system including a piezoelectric element.

FIG. 19 is a diagram of a fourth particular illustrative embodiment of a power generation system 1900. The power generation system 1900 includes a pipe portion 1902, a nut portion 1904, a lock nut portion 1906, and a power generator portion 1908. The power generator portion 1908 includes a ring 1912 to secure a diaphragm 1914 relative to a piezoelectric generator 1916. The power generator portion 1908 further includes fasteners, such as screws 1919, to secure the piezoelectric generator 1916. In a particular example, the piezoelectric generator 1916 is a piezoelectric crystal beam.

The power generation device 1900 further includes an opening 1918 and a pin 1920 extending across the opening 1918. The pin 1920 operates as an annubar or vortex shedding bar to generate an asymmetric vertical flow, which causes the diaphragm 1914 to vibrate in response to the fluctuations in the process fluid. Such fluctuations cause the diaphragm 1914 to move and to induce current flow in the piezoelectric generator 1916. In a particular embodiment, the piezoelectric generator 1916 may vibrate with the diaphragm 1914, inducing current flow in the piezoelectric generator 1916.

Figure 20:
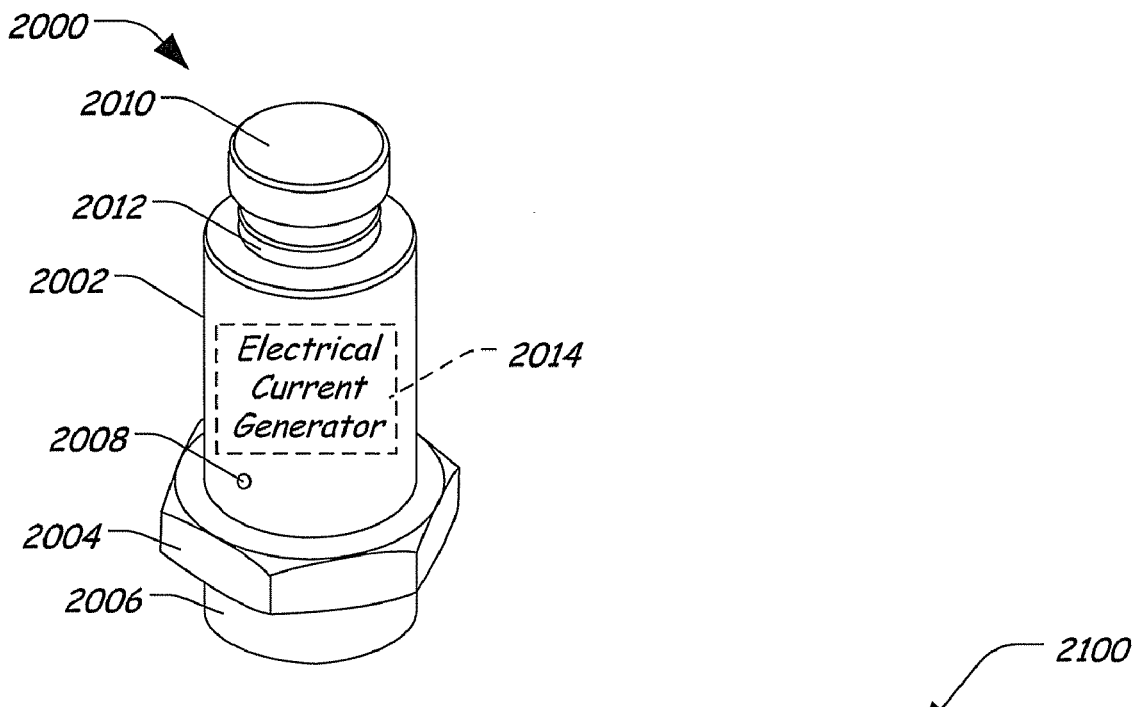
FIG. 20 is a top plan view of a particular illustrative embodiment of a power generation system including a pressure/vibration frequency adjustment feature.

FIG. 20 is a top plan view of a particular illustrative embodiment of a power generation system 2000 including a pressure/vibration frequency adjustment screw 2010, which may be rotated to alter a pressure and/or a vibration-frequency associated with the power generation system 2000. The power generation system 2000 includes a housing 2002 having a nut portion 2004 and a pipe portion 2006. The housing 2002 also includes a high-pressure opening 2008, which may be coupled to a high-pressure side of a differential pressure generating device, such as an annubar, an orifice plate, another differential pressure generating device, or any combination thereof. The power generation system 2000 further includes a pressure/vibration frequency adjustment screw 2010 and a lock nut 2012 to couple the pressure/vibration frequency adjustment screw 2010 to the housing 2002. The housing 2002 is adapted to house an electrical current generator 2014, which is adapted to produce an electrical current from a process fluid.

In a particular embodiment, the power generation system 2000 is coupled to a pipe of an industrial process to produce an electrical current related to kinetic energy received from the pipe. In a particular example, the power generation system 2000 is adapted to produce the electrical current from fluid pressure, vibrations, and other process fluid parameters.

Figure 21:
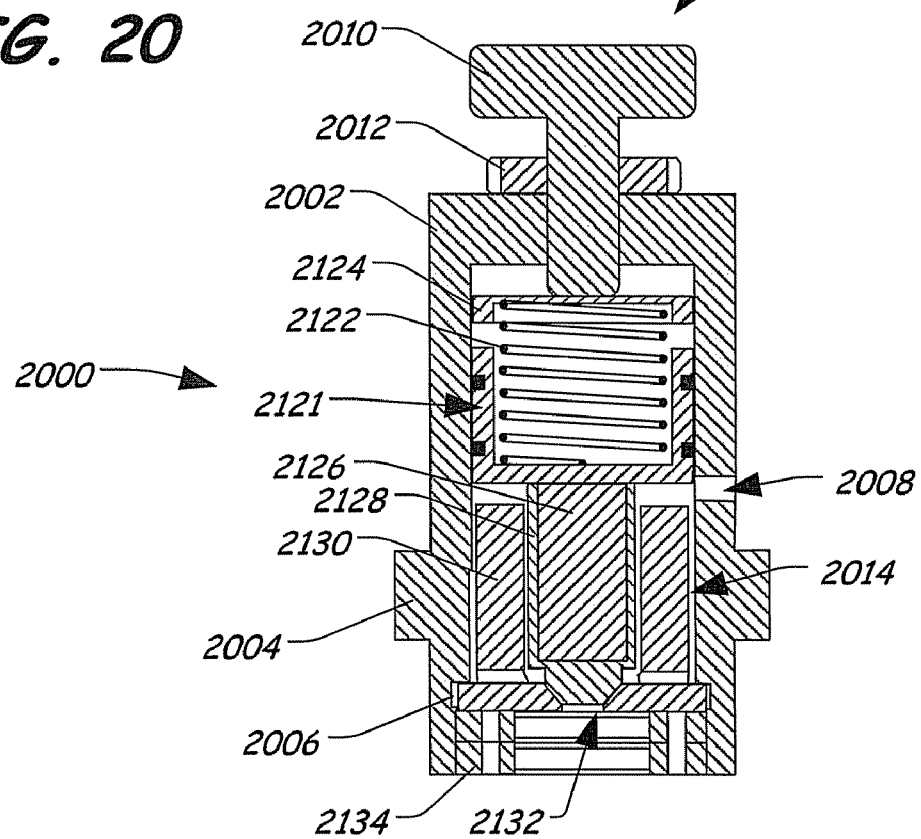
FIG. 21 is a cross-sectional view of the power generation system of FIG. 20.

FIG. 21 is a cross-sectional view 2100 of the power generation system 2000 of FIG. 20. The power generation system 2000 includes the pressure/vibration frequency adjustment screw 2010, the lock nut 2012, and the housing 2002, including the nut portion 2004 and the pipe portion 2006. The housing 2002 includes the high-pressure opening 2008 and is adapted to house the electrical current generator 2014. The power generation device 2000 includes a piston 2120 including a spring 2122 and a spring cover 2124. The electrical current generator 2014 includes a magnet 2126 within a magnet housing 2126 surrounded by a voice coil 2130. The magnet housing 2126 is adapted to operate as a valve relative to a pressure opening 2132. The power generation system 2000 further includes a lock screw 2134 to couple to a process pipe.

In a particular embodiment, the power generation system 2000 is coupled to a process pipe and adapted to receive process fluid at the high-pressure opening 2008. Fluid pressure associated with the process fluid causes the magnet housing 2128 and the magnet 2126 to move upward. Such movement compresses the spring 2122. When the magnet housing 2128 is moved sufficiently, high pressure is vented through the low-pressure opening 2132 and the spring 2122 forces the valve to close the low-pressure opening 2132, by pushing the magnet 2126 and the magnet housing 2128 downward, closing the low-pressure opening 2132. The fluid pressure again pushes against the valve, causing the magnet housing 2128 and the magnet 2126 to move upward, and the cycle is repeated. The movement of the magnet 2126 relative to the voice coil 2130 induces an electrical current in the voice coil 2130, which may be stored at a power storage component and used to power various circuits. For example, the voice coil 2130 can be coupled to a power converter and a power storage component, such as the power converter 224 and the power storage component 226 illustrated in FIG. 2. In a particular embodiment, the power generation system 1800 is located at a low-pressure side of an orifice plate or another differential pressure generating device. The high pressure opening 2008 is coupled to the high pressure side of the orifice plate or the other differential pressure generating device.

Figure 22:
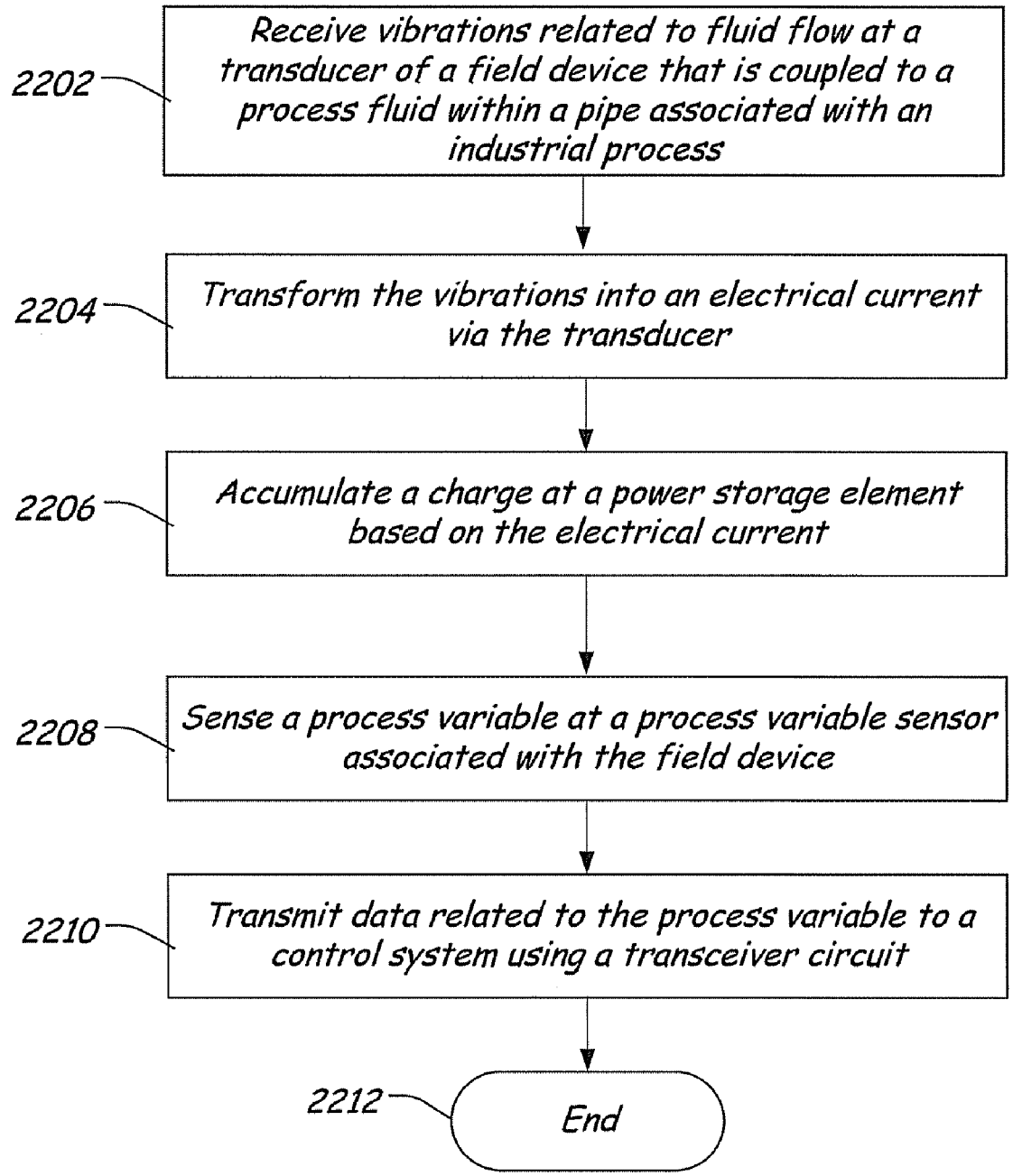
FIG. 22 is a flow diagram of a particular illustrative embodiment of a method of deriving process device power from an industrial process.

FIG. 22 is a flow diagram of a particular illustrative embodiment of a method of deriving process device power from an industrial process. At 2202, vibrations related to fluid flow are received at a transducer of a field device that is coupled to a process fluid within a pipe associated with an industrial process. Advancing to 2204, the vibrations are transformed into an electrical current via the transducer. Continuing to 2206, a charge is accumulated at a power storage element based on the electrical current. Proceeding to 2208, a process variable is sensed at a process variable sensor associated with the field device. Moving to 2210, data related to the process variable is transmitted to a control system using a transceiver circuit. The method terminates at 2212.

In a particular embodiment, the method further includes providing power from the power storage element to a display interface of the field device to display data related to the sensed process variable. In another particular example, the process variable sensor and the transceiver circuit are powered from the power storage element.

In a particular embodiment, the transducer is a piezoelectric component adapted to flex in response to the fluid pressure to produce the electrical current. In another particular example, the transducer includes a fixed conductive coil and a movable magnet adapted to move relative to the fixed conductive coil in response to the fluid pressure to induce the electrical current to flow through the fixed conductive coil. In another example, the transducer may include a moveable conductive coil and a stationary magnet. In a particular example, the transducer may include an isolating diaphragm coupled to the process fluid and adapted to move in response to the fluid pressure to alter a location of the movable magnet or the moveable conductive coil. In still another particular example, the transducer may include a diaphragm adapted to move in response to fluid pressure to induce current flow in a piezoelectric generator. In another example, the transducer can include an adjustable spring that is coupled to a movable magnet and adapted to cause the movable magnet to reciprocate along an axis of a fixed conductive coil. In another particular embodiment, the transducer includes a turbine adapted to rotate in response to a process fluid flow to produce kinetic energy that can be converted into an electrical current. The turbine may be included within a flow meter having an opening to allow process fluid to flow around the turbine.

Figure 23:
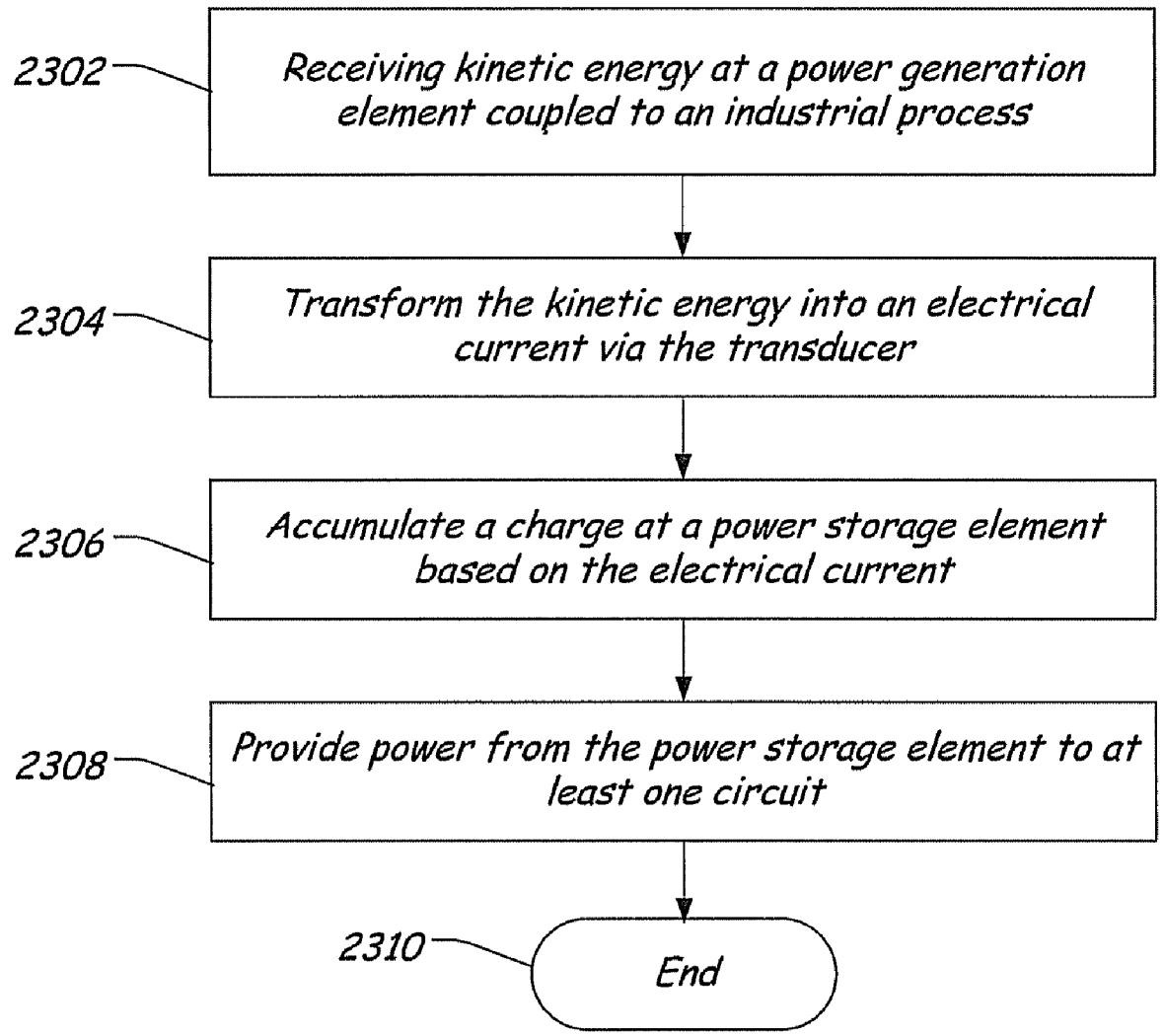
FIG. 23 is a flow diagram of a second particular illustrative embodiment of a method of deriving process device power from an industrial process.

FIG. 23 is a flow diagram of a second particular illustrative embodiment of a method of deriving process device power from an industrial process. At 2302, kinetic energy is received at a power generation element coupled to an industrial process. The kinetic energy may be received from vortex shedding, process fluid flow noise, acoustic noise, process vibrations, pressure pulsations, other fluid disruption, other kinetic energy sources, or any combination thereof. In a particular embodiment, the kinetic energy may be derived from disruptions in the process fluid flow due to a fluid disruption generating element (such as a primary element) that may be associated with a process control measurement transmitter, such as a flow meter or pressure transducer. Such process control measurement transmitters may include a primary element that is positioned within the process fluid flow stream to generate fluid disruptions, such as differential pressure. A primary element can include an orifice plate, an annubar or vortex shedding bar, a Venturi tube, other flow disruption generation elements, or any combination thereof.

Moving to 2304, the kinetic energy is transformed into an electrical current via the transducer. In a particular example, the kinetic energy may be transformed using a piezoelectric crystal beam power generator, a magnet/voice-coil power generator, a turbine power generator, another electrical transducer, or any combination thereof. Continuing to 2306, a charge is accumulated at a power storage element based on the electrical current. In a particular example, the power storage element may be a battery, a capacitor, another power storage component, or any combination thereof.

Proceeding to 2308, power is provided from the power storage element to at least one circuit. In a particular example, a power regulator circuit may direct power from the power storage element to a display interface (such as a light-emitting diode display, a liquid crystal display, another display interface, or any combination thereof). In another particular example, power storage element may provide surplus power to a processor or to other circuitry to perform various functions without drawing power from a central control system. The method terminates at 2310.

Although the present invention has been described with reference to preferred embodiments, workers skilled in the art will recognize that changes may be made in form and detail without departing from the spirit and scope of the invention.

What is claimed is:

1. A process device comprising:
   a fluid disruption generation element to generate a fluid disruption within process fluid flowing through a pipe associated with an industrial process;
   a process variable sensor coupled to the fluid disruption generation element to measure a process parameter;
   a power generation element generating an electrical output signal in response to the fluid disruption; and
   a power storage component coupled to the power generation element, the power storage component accumulating a charge from the electrical output signal, the power storage element used to power circuitry of the process device with power from the fluid disruption.

2. The process device of claim 1, further comprising a display interface coupled to the power storage component, the display interface using the accumulated charge from the power storage component for operation.

3. The process device of claim 1, wherein the power generation element comprises a piezoelectric element configured to flex in response to the fluid disruption to generate the electrical output signal.

4. The process device of claim 1, wherein the power generation element comprises a turbine turning in response to the fluid disruption to generate the electrical output signal.

5. The process device of claim 1, wherein the power generation element comprises an electrically conductive coil and a magnet, wherein the magnet and the electrically conductive coil are moving relative to one another in response to the fluid disruption to generate the electrical output signal within the electrically conductive coil.

6. The process device of claim 5, wherein the power generation element is coupled to the fluid disruption generation element via an attachment arm.

7. The process device of claim 1, wherein the power generation element comprises:
   an isolating diaphragm deforming in response to the fluid disruption;
   a fixed conductive coil proximate to the isolating diaphragm; and
   a magnet coupled to the isolating diaphragm and moving relative to the fixed conductive coil in response to deformation of the isolating diaphragm to induce the electrical output signal in the fixed conductive coil.

8. A process device for use in a control or monitoring system associated with an industrial process, the process device comprising:
   a transmitter housing coupled to a pipe carrying a process fluid that is associated with an industrial process;
   a process variable sensor measuring a process variable associated with the process fluid;

a transducer coupled to the process fluid, the transducer generating an electrical output from the process fluid flowing within the pipe;

a power storage component coupled to the transducer and storing a charge from the electrical output, and thereby store power generated from the process fluid; and circuitry coupled to the power storage component and to the process variable sensor, the circuitry adapted to receive a power supply from the power storage component and to provide an output signal related to the process variable.

9. The process device of claim 8, further comprising a fluid disruption generating element causing fluid disruption within the process fluid.

10. The process device of claim 9, wherein the disruption generating element comprises one of a Venturi tube, an annubar, a fluid vortex shedding bar, and an orifice plate.

11. The process device of claim 9, wherein the transducer comprises a piezoelectric transducer producing the electrical output in response to the fluid disruption.

12. The process device of claim 9, wherein the transducer is attached to the disruption generating element.

13. The process device of claim 9, wherein the disruption generating element includes an opening to receive the process fluid, and wherein the transducer is disposed within the disruption-generating element and is receiving the process fluid via the opening.

14. The process device of claim 8, further comprising a differential pressure generating element, wherein the transducer is positioned downstream from the differential pressure generating element within the pipe.

15. The process device of claim 8, wherein the transducer comprises a fluid turbine extending into the pipe, the fluid turbine turning in response to the process fluid to produce the electrical output.

16. The process device of claim 8, further comprising a transceiver transmitting data related to the output signal to a control center via a wireless communication path, the transceiver adapted to receive operating power from the power storage element.

17. The process device of claim 8, wherein the transducer comprises an electrically conductive coil and a magnet, wherein the magnet and the electrically conductive coil are moving relative to one another in response to the fluid disruption to generate the electrical output signal within the electrically conductive coil.

18. The process device of claim 8, wherein the transducer comprises:
an isolating diaphragm deforming in response to the fluid disruption;
a fixed conductive coil; and
a magnet coupled to the isolating diaphragm and moving relative to the fixed conductive coil in response to deformation of the isolating diaphragm, wherein relative movement of the magnet induces the electrical output in the fixed conductive coil.

19. A method of deriving process device power for a process variable transmitter from an industrial process, the method comprising:
receiving vibrations related to fluid flow at a transducer of a field device that is coupled to a process fluid within a pipe associated with an industrial process;
sensing a process variable based upon the received vibrations;
transforming the vibrations into an electrical current via the transducer;
accumulating a charge at a power storage element based on the electrical current;
sensing a process variable at a process variable sensor associated with the field device; and
transmitting data related to the process variable to a control system using a transceiver circuit;
powering circuitry of the process device with power generated from the received vibrations accumulated in the power storage element.

20. The method of claim 19, further comprising generating a fluid disruption within the process fluid using a fluid disruption element positioned upstream from the transducer.

21. The method of claim 19, further comprising providing power from the power storage element to a display interface of the field device to display data related to the sensed process variable.

22. The method of claim 19, wherein the process variable sensor and the transceiver circuit are powered from the power storage element.

23. The method of claim 19, wherein the transducer comprises a piezoelectric component flexing in response to the fluid pressure to produce the electrical current.

24. The method of claim 19, wherein the transducer comprises a turbine rotating in response to the fluid pressure, the turbine to generate the electrical current.

25. The method of claim 24, wherein the field device comprises a vortex flow meter including an opening, and wherein the turbine is positioned within the vortex flow meter and receiving the process fluid via the opening.

26. The method of claim 19, wherein the transducer comprises:
a fixed conductive coil; and
a movable magnet moving relative to the fixed conductive coil in response to the fluid pressure to induce the electrical current to flow through the fixed conductive coil.

27. The method of claim 26, wherein the transducer further comprises:
an isolating diaphragm coupled to the process fluid, the isolating diaphragm moving in response to the fluid pressure to alter a location of the movable magnet; and
an adjustable spring coupled to the movable magnet and causing the movable magnet to reciprocate along an axis of the fixed conductive coil.

* * * * *